United States Patent
Helmer

(10) Patent No.: US 12,527,917 B2
(45) Date of Patent: Jan. 20, 2026

(54) APPARATUS FOR MEASURING MEDICAMENT LEVEL

(71) Applicant: Sanofi, Paris (FR)

(72) Inventor: Michael Helmer, Frankfurt am Main (DE)

(73) Assignee: SANOFI, Paris (FR)

( * ) Notice: Subject to any disclaimer, the term of this patent is extended or adjusted under 35 U.S.C. 154(b) by 669 days.

(21) Appl. No.: 17/438,081

(22) PCT Filed: Mar. 10, 2020

(86) PCT No.: PCT/EP2020/056397
§ 371 (c)(1),
(2) Date: Sep. 10, 2021

(87) PCT Pub. No.: WO2020/182838
PCT Pub. Date: Sep. 17, 2020

(65) Prior Publication Data
US 2022/0184320 A1 Jun. 16, 2022

(51) Int. Cl.
*A61M 5/315* (2006.01)
*A61M 5/24* (2006.01)
(Continued)

(52) U.S. Cl.
CPC .......... *A61M 5/31568* (2013.01); *A61M 5/24* (2013.01); *A61M 5/31511* (2013.01);
(Continued)

(58) Field of Classification Search
CPC ................ A61M 5/31568; A61M 5/24; A61M 5/3213; A61M 2005/3126;
(Continued)

(56) References Cited

U.S. PATENT DOCUMENTS

| | | | |
|---|---|---|---|
| 2010/0102799 A1 | 4/2010 | Schnidrig | |
| 2015/0190577 A1 | 7/2015 | Shaanan et al. | |
| 2015/0202375 A1 | 7/2015 | Schabbach et al. | |
| 2017/0052054 A1* | 2/2017 | Merker | G01S 7/521 |

(Continued)

FOREIGN PATENT DOCUMENTS

| | | |
|---|---|---|
| CN | 107921211 A | 4/2018 |
| CN | 108601902 A | 9/2018 |

(Continued)

OTHER PUBLICATIONS

International Preliminary Report on Patentability in International Application No. PCT/EP2020/056397, dated Aug. 25, 2021, 11 pages.

(Continued)

*Primary Examiner* — Michael J Dalbo
*Assistant Examiner* — Kaleria Knox
(74) *Attorney, Agent, or Firm* — Bond, Schoeneck & King, PLLC

(57) ABSTRACT

An apparatus including a control unit, a sensor arrangement configured to measure the fill level of a medicament within a container of a drug delivery device, and a cap sensor configured to detect at least partial removal of a cap from the drug delivery device is described. The control unit is configured to be awoken from a dormant state in response to detection by the cap sensor that the cap has been at least partially removed from the drug delivery device. The sensor arrangement is configured to start measurement of the fill level subsequent to the control unit being awoken from the dormant state.

18 Claims, 16 Drawing Sheets

(51) Int. Cl.
*A61M 5/31* (2006.01)
*A61M 5/32* (2006.01)
*G16H 20/17* (2018.01)

(52) U.S. Cl.
CPC .......... *A61M 5/3213* (2013.01); *G16H 20/17* (2018.01); *A61M 2005/3126* (2013.01); *A61M 2205/3306* (2013.01); *A61M 2205/3379* (2013.01); *A61M 2205/3561* (2013.01); *A61M 2205/50* (2013.01); *A61M 2205/8212* (2013.01)

(58) Field of Classification Search
CPC ............. A61M 2205/3306; A61M 2205/3379; A61M 2205/3561; A61M 2205/50; A61M 2205/8212; G16H 20/17
See application file for complete search history.

(56) References Cited

U.S. PATENT DOCUMENTS

| | | | |
|---|---|---|---|
| 2018/0177325 A1* | 6/2018 | Lyons | .................... A47J 31/401 |
| 2018/0280607 A1 | 10/2018 | Richards et al. | |
| 2018/0344943 A1 | 12/2018 | Halm | |
| 2018/0369497 A1 | 12/2018 | Schader et al. | |
| 2019/0054252 A1* | 2/2019 | Amschler | ................ A61M 5/24 |

FOREIGN PATENT DOCUMENTS

| | | | | |
|---|---|---|---|---|
| EP | 1920793 | | 5/2008 | |
| JP | 2012519025 A | | 8/2012 | |
| JP | 2014-500746 A | | 1/2014 | |
| JP | 2015-528318 A | | 9/2015 | |
| JP | 2017531454 A | | 10/2017 | |
| KR | 20170099955 A | * | 9/2017 | ............. G01N 11/06 |
| WO | WO 2000/074763 A2 | | 12/2000 | |
| WO | WO 2010/098927 | | 9/2010 | |
| WO | WO-2010098927 A1 | * | 9/2010 | ............ A61M 5/178 |
| WO | WO 2012/062843 A1 | | 5/2012 | |
| WO | WO 2016/019375 | | 2/2016 | |
| WO | WO-2016019375 A1 | * | 2/2016 | ......... A61B 5/14532 |
| WO | WO 2017/021227 A1 | | 2/2017 | |
| WO | WO 2017/050781 A1 | | 3/2017 | |
| WO | WO 2018/036938 | | 3/2018 | |
| WO | WO 2018/046660 A1 | | 3/2018 | |
| WO | WO-2018036938 A1 | * | 3/2018 | .......... A61M 5/2033 |
| WO | WO 2018/138192 | | 8/2018 | |
| WO | WO-2018138192 A1 | * | 8/2018 | ............. A61M 5/24 |
| WO | WO 2018/224460 | | 12/2018 | |
| WO | WO-2018224460 A1 | * | 12/2018 | ............. A61M 5/24 |

OTHER PUBLICATIONS

International Search Report and Written Opinion in International Application No. PCT/EP2020/056397, dated Apr. 9, 2020, 15 pages.
Decision of Refusal, JP Patent Application No. 2021-554661, dated Sep. 17, 2024, pp. 1-2 (with p. 1 being an English translation).
Decision of Dismissal of Amendment, JP Patent Application No. 2021-554661, dated Sep. 17, 2024, pp. 1-13 (with pp. 1-6 being an English translation).

* cited by examiner

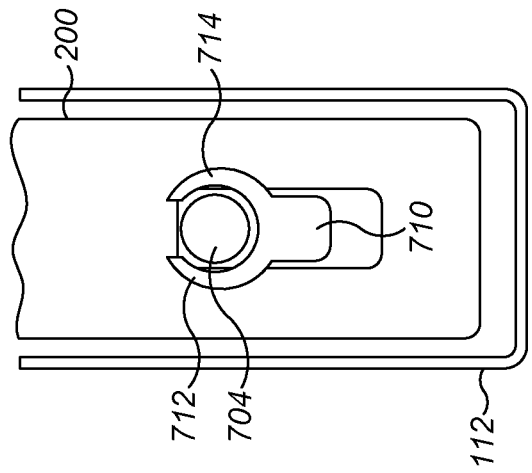
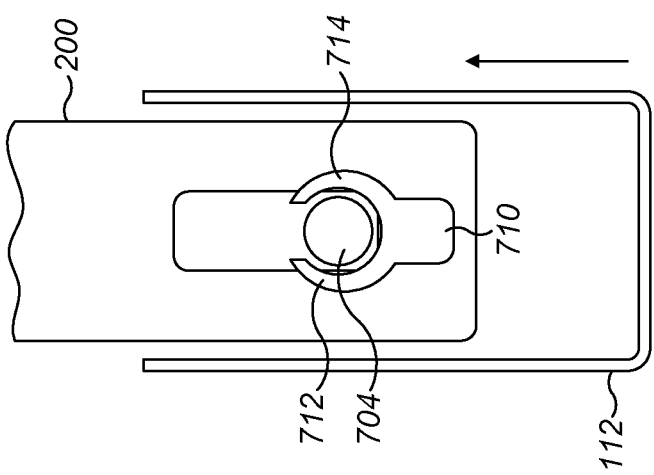
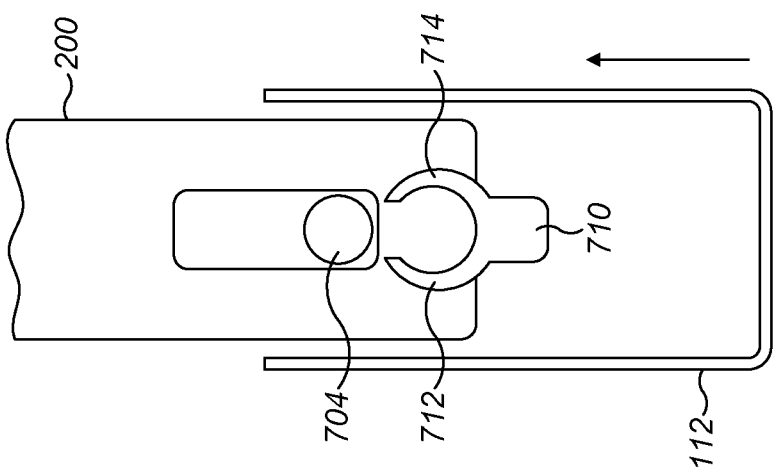

APPARATUS FOR MEASURING MEDICAMENT LEVEL

CROSS REFERENCE TO RELATED APPLICATIONS

The present application is the national stage entry of International Patent Application No. PCT/EP2020/056397, filed on Mar. 10, 2020, and claims priority to Application No. EP 19305289.1, filed on Mar. 12, 2019, the disclosures of which are incorporated herein by reference.

TECHNICAL FIELD The present invention relates to an apparatus for measuring the fill level of medicament within a container of a drug delivery device.

BACKGROUND

A variety of diseases exists that require regular treatment by injection of a medicament. Such injection can be performed by using injection devices, which are applied either by medical personnel or by patients themselves. As an example, type-1 and type-2 diabetes can be treated by patients themselves by injection of insulin doses, for example once or several times per day. For instance, a pre-filled disposable insulin pen can be used as an injection device. Alternatively, a re-usable pen may be used. A re-usable pen allows replacement of an empty medicament cartridge by a new one. Either pen may come with a set of one-way needles that are replaced before each use. The insulin dose to be injected can then for instance be manually selected at the insulin pen by turning a dosage knob and observing the actual dose from a dose window or display of the insulin pen. The dose is then injected by inserting the needle into a skin portion and pressing an injection button of the insulin pen.

To be able to monitor insulin injection, for instance to keep track of the dose already ejected, it is desirable to measure the fill level of medicament within the injection device. In other words, it is desirable to measure the amount of medicament contained within a container of the injection device.

SUMMARY

According to a first aspect of the present disclosure, there is provided an apparatus comprising a control unit; a sensor arrangement configured to measure the fill level of a medicament within a container of a drug delivery device; and a cap sensor configured to detect at least partial removal of a cap from the drug delivery device; wherein the control unit is configured to be awoken from a dormant state in response to detection by the cap sensor that the cap has been at least partially removed from the drug delivery device, and wherein the sensor arrangement is configured to start measurement of the fill level subsequent to the control unit being awoken from the dormant state. A simple, intuitive and energy-efficient means for determining the amount of medicament in a drug delivery device is therefore provided.

Measurement of the fill level may be started in response to the detection by the cap sensor that the cap has been at least partially removed from the drug delivery device.

The apparatus may comprise a wireless communication module and measurement of the fill level may be started in response to receipt of a signal by the wireless communication module.

The apparatus may be a supplemental device attachable to the drug delivery device.

The apparatus may be attachable to a cartridge holder of the drug delivery device, the cartridge holder being configured to contain the container.

The cap sensor may comprise at least one of a reed switch, photodiode and/or a mechanical switch.

The apparatus may comprise a collar, wherein the collar is configured to receive a cartridge holder of the drug delivery device through an aperture of the collar.

The sensor arrangement may be configured to measure the fill level through a window in a cartridge holder of the drug delivery device.

The sensor arrangement may comprise an array of LEDs and a light sensor, wherein the array of LEDs and light sensor are configured to extend parallel to a longitudinal axis of the container.

The apparatus may comprise a wireless communication module and may be configured to transmit a signal from the wireless communication module to an external device, the signal comprising data representing one or more fill level measurements made by the sensor arrangement.

Measurement of the fill level may be stopped in response to the wireless communication module of the apparatus receiving a signal from the external device.

Measurement of the fill level may be stopped in response to detection by the cap sensor of the cap being reattached to the drug delivery device.

Measurement of the fill level may comprise measuring the fill level between discrete time intervals. The discrete time intervals vary over time. The discrete time intervals increase over time.

The apparatus may be configured to stop measurement of the fill level in response to determining that the fill level has not changed for a predetermined period of time or for a predetermined number of measurements.

According to a second aspect of the present disclosure, there is provided a system comprising a drug delivery device and an aforementioned apparatus attached to the drug delivery device. The drug delivery device may contain a medicament, for example in a container of the drug delivery device.

The drug delivery device may comprise a container containing a medicament, the container comprising a stopper having a reflective ring around a circumference of the stopper, wherein the sensor arrangement is configured to measure a fill level of the medicament by determining a position of the stopper in relation to a longitudinal axis of the container, wherein determining a position of the stopper comprises emitting light towards the container and detecting light reflected back from the container by the reflective ring.

According to a third aspect of the present disclosure, there is provided a method comprising: detecting by a cap sensor of an apparatus at least partial removal of a cap from a drug delivery device; in response to detection of the at least partial removal of the cap from the drug delivery device, awaking a control unit of the apparatus from a dormant state; and starting measurement, by a sensor arrangement of the apparatus, of the fill level of a medicament within a container of the drug delivery device subsequent to the control unit being awoken from the dormant state.

BRIEF DESCRIPTION OF THE FIGURES

Exemplary embodiments of the present invention are described with reference to the accompanying drawings, in which:

FIG. 7E is a schematic, top-view cross section of the apparatus, injection device and cap of FIG. 7C, with the cap detached from the apparatus;

FIG. 7F is a schematic, top-view cross section of the apparatus, injection device and cap of FIG. 7E, wherein the cap has been moved towards the apparatus;

FIG. 7G is a schematic, top-view cross section of the apparatus, injection device and cap of FIG. 7F, wherein the cap has been attached to the apparatus;

Reference will now be made in detail to the embodiments of the present invention, examples of which are illustrated in the accompanying drawings, wherein like reference numerals refer to like elements throughout.

DETAILED DESCRIPTION

Embodiments of the invention provide an apparatus for measuring the fill level of a medicament within a drug delivery device. A cap sensor of the apparatus detects at least partial removal of a cap from the drug delivery device and in response wakes a control unit of the apparatus from a dormant state in order to start measurement of the fill level.

A drug delivery device, as described herein, may be configured to eject a medicament into a patient. For example, delivery could be sub-cutaneous, intra-muscular, or intravenous. Such a device could be operated by a patient or care-giver, such as a nurse or physician, and can include various types of safety syringe, pen-injector, or auto-injector. The device can include a cartridge-based system that requires piercing a sealed ampule of the container before use. Volumes of medicament delivered with these various devices can range from about 0.5 ml to about 2 ml.

In the following, embodiments of the present invention will be described with reference to the drug delivery device being an injection device. The present invention is however not limited to such application and may equally well be deployed with other types of drug delivery device.

Figure 1:
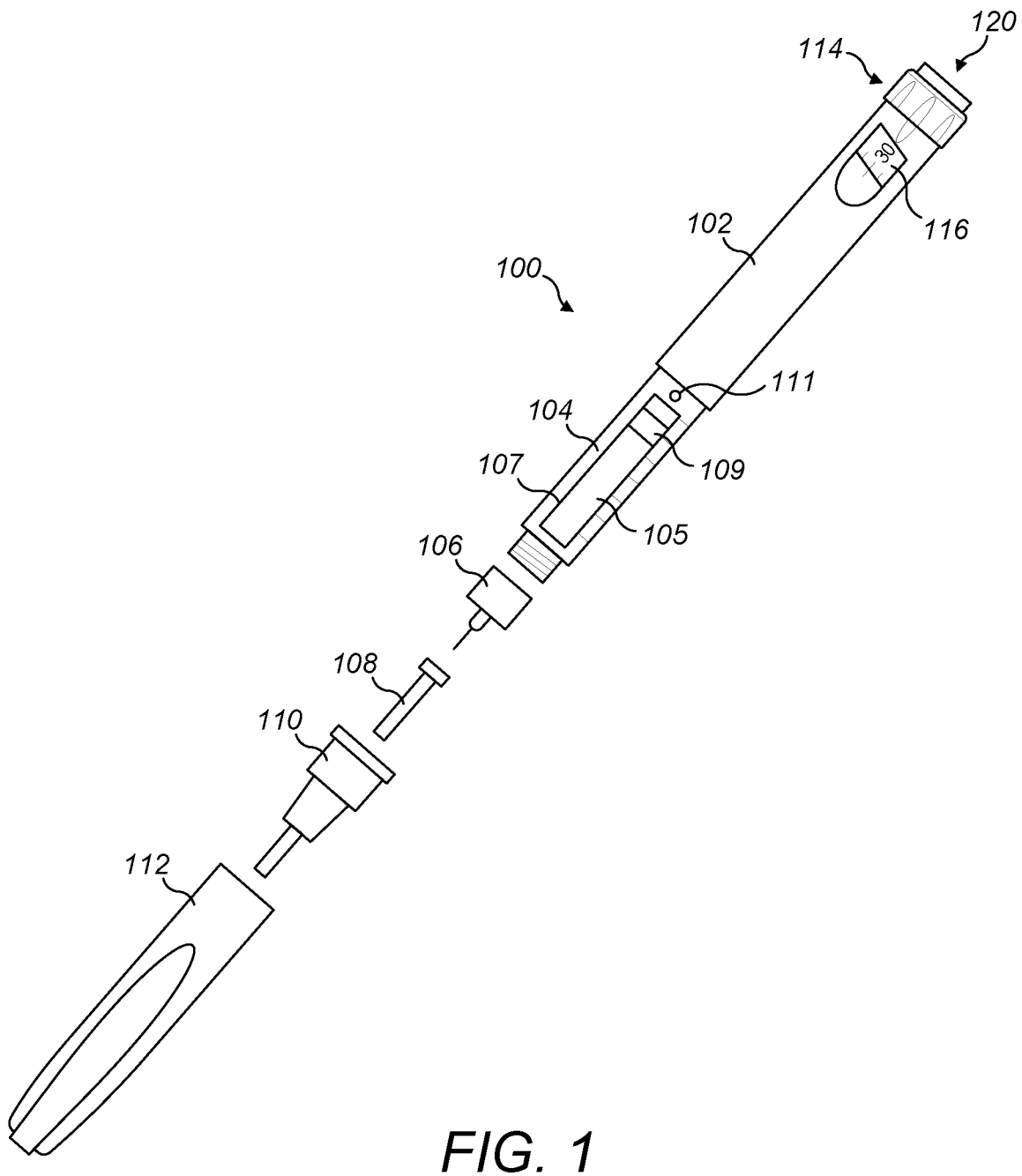
FIG. 1 is an exploded view of an injection device suitable for use with embodiments of the present invention.

FIG. 1 is an exploded view of an injection device 100 suitable for use with embodiments of the present invention, which may for instance represent Sanofi's Solostar™ (R) insulin injection pen.

The injection device 100 has a distal end and a proximal end. The term "distal" refers to a location that is relatively closer to a site of injection, and the term "proximal" refers to a location that is relatively further away from the injection site.

The injection device 100 comprises a housing 102 and a cartridge holder 104 for containing a medicament container 105. As shown, housing 102 is substantially cylindrical and has a substantially constant diameter along its longitudinal axis.

The cartridge holder 104 has a window 107 in a side thereof. The window 107 allows the user to view the medicament container 105 through the window 107 when the medicament container 105 is contained in the cartridge holder 104. FIG. 1 shows a stopper 109 of the medicament container 105 visible through the window 107. FIG. 1 shows the cartridge holder 104 having one window 107, however the cartridge holder 104 may instead have more than one window 107. For example, the cartridge holder 104 may have a first window 107 located on one side of the cartridge holder 104 and a second window 107 located on a second, in some cases opposing, side of the cartridge holder 104. Thus a first side of the medicament container 105 within the cartridge holder 104 may be visible through the first window 107 while a second, different side of the medicament container 105 may be visible through the second window 107. Other window 107 configurations may be used.

A needle 106 can be affixed to the cartridge holder 104 such that the needle 106 is in fluid communication with the medicament container 105. The needle is protected by an inner needle cap 108 and an outer needle cap 110, which in turn is covered by a removable cap 112. The cap 112 at least partially covers the cartridge holder 104, and hence medicament container 105, when attached to the injection device 100. The cap 112 may also be attached to the injection device 100 such that it at least partially covers the cartridge holder 104 without one or more of the needle 106, inner needle cap 108 or outer needle cap 110 being present.

The cartridge holder 104 may have a cap retaining feature 111 on an outer surface, for example at a proximal end of the cartridge holder 104, adjacent the housing 102. The cap retaining feature 111 engages with a corresponding coupling feature on an inner surface of the cap 112 to hold the cap 112 in place when attached to the injection device 100. The cap retaining feature 111 may comprise one or more of a ridge, groove, bump, lock and/or pip. In some examples, the cap retaining feature is located on the housing 102 of the injection device 100.

A medicament dose to be ejected from injection device 100 can be selected by turning the dosage knob 114, and the selected dose is then displayed via dosage window 116, for instance in multiples of International Units (IU). An example of a selected dose displayed in dosage window 116 may be 30 IUs, as shown in FIG. 1. It should be noted that the selected dose may equally well be displayed differently, for instance by means of an electronic display.

Turning the dosage knob 114 causes a mechanical click sound to provide acoustic feedback to a user. The numbers displayed in dosage window 116 are printed on a sleeve (not shown) that is contained in housing 102 and mechanically interacts with a stopper 109 (also known as a piston) within the medicament container 104. When needle 106 is stuck into a skin portion of a patient, and then injection button 120 is pushed, the medicament dose displayed in display window 116 is ejected from injection device 100. When the needle 106 of injection device 100 remains for a certain time in the skin portion after the injection button 120 is pushed, a high percentage of the dose is actually injected into the patient's body. Ejection of the medicament dose also causes a mechanical click sound, which is however different from the sounds produced when using dosage knob 114.

Injection device 100 may be used for several injection processes until either medicament container 105 is empty or the expiration date of injection device 100 (e.g. 28 days after the first use) is reached. Injection device 100 may be single-use or reusable.

Figure 2:
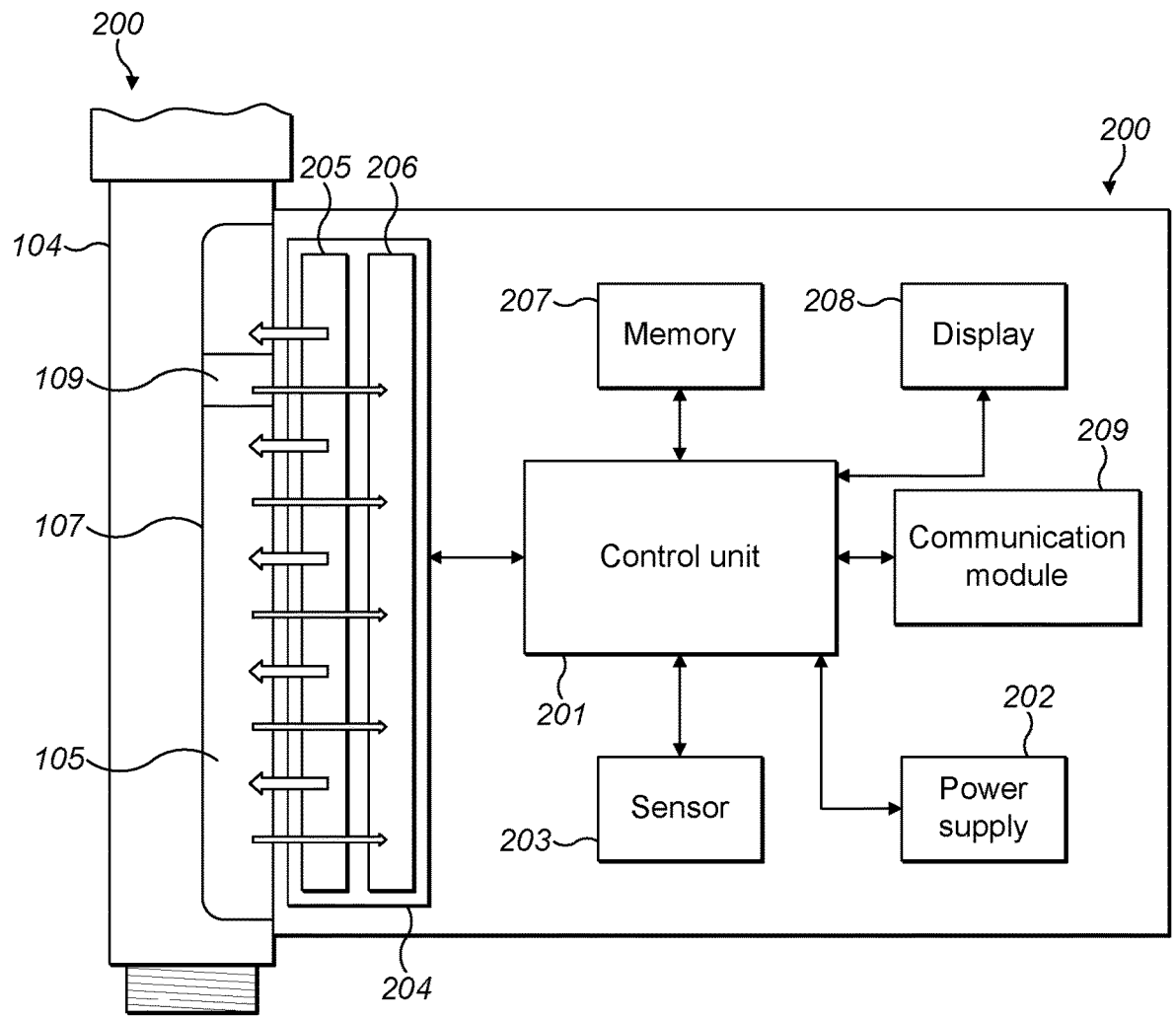
FIG. 2 is a schematic view of an apparatus for measuring the fill level of medicament within a container in accordance with embodiments of the present invention in a state where it is attached to the injection device of FIG. 1.

FIG. 2 shows a schematic representation of an apparatus 200 according to aspects of the present invention. The apparatus 200 is for measuring the fill level of a medicament within a drug delivery device, or in other words determining the amount of medicament present in the medicament container 105.

FIG. 2 shows the apparatus 200 as a supplemental device configured to be attached to a drug delivery device such as the injection device 100 of FIG. 1. However, in other examples the apparatus 200 may be integrally formed with the drug delivery device.

FIG. 2 shows the apparatus 200 coupled to the cartridge holder 104 of the injection device 100 so that the apparatus 200 at least partially obscures the window 107 of the cartridge holder 104. The apparatus 200 can comprise attachment means (not shown) for coupling the apparatus 200 to the cartridge holder 104. Examples of the attachment means are discussed later. The attachment means may be configured to releasably or permanently attach the apparatus 200 to the injection device 100.

FIG. 200 shows the electronics of the apparatus 200. The apparatus 200 comprises a control unit 201 for controlling the operation of various components of the apparatus 200. The control unit 201 may for instance be a single- or multi-core microprocessor, a Digital Signal Processor (DSP), Application Specific Integrated Circuit (ASIC), Field Programmable Gate Array (FPGA) or the like.

The apparatus further comprises a power supply 202 such as a battery or capacitor for supplying power to the control unit 201 and other electrical components of the apparatus 200. The apparatus 200 may initially be supplied to a user without the power supply 202 present. The power supply 202 may subsequently be installed into the apparatus 200 by the user before use. In some examples, the power supply 202 may receive power from an external source by electromagnetic induction.

The control unit 201 may initially be in a dormant state, also known as a sleep state. In this dormant state, the control unit 201 can only perform a limited number of functions, or no functions, out of all the functions the control unit 201 can possibly perform. The control unit 201 may be woken from the dormant state to an awoken state. In the awoken state the control unit 201 can perform more functions than in the dormant state, or can perform different functions to when in the dormant state. For example, the control unit 201 may be able to initiate and control measurement of the fill level of a medicament in the medicament container 105 of an injection device 100 when in the awoken state, but not when in the dormant state. The control unit 201 generally consumes less (or no) power when in the dormant state compared to the awoken state.

It can therefore be advantageous in terms of power conservation to have the control unit 201 in the dormant state until use of the apparatus 200 and injection device 100 is required by a user.

The apparatus 200 comprises a cap sensor 203 for detecting at least partial removal of the cap 112 from the drug delivery device 100 and/or apparatus 200. The at least partial removal of the cap 112 from the drug delivery device 100 causes a corresponding signal to be sent from the cap sensor 203 to the control unit 201. The control unit 201 may then react accordingly. For example, detection of the at least partial removal of the cap 112 by the sensor 203 causes the control unit 201 to receive a signal which awakes the control unit 201 from the dormant state and transitions the control unit 201 to the awoken state. In some examples, detection of attachment/reattachment of the cap 112 by the sensor 203 causes the control unit 201 to receive a signal which transitions the control unit 201 from the awoken state to the dormant state. For example, detection of attachment/reattachment of the cap 112 by the sensor 203 can cause the control unit 201 to stop measurement of the fill level of the medicament container 105.

The apparatus 200 further comprises a sensor arrangement 204, also referred to as a fill level sensor, for measuring the fill level of medicament in the medicament container 105 of the drug delivery device 100. The sensor arrangement 204 may be an optical sensor arrangement. FIG. 3 shows the fill level sensor 204 comprising a light source 205, such as an LED array, and a light sensor 206, such as a charge-coupled device (CCD). However, other fill level sensors may be used. The fill level of medicament in a medicament container 105 corresponds to the volume of medicament contained in the container 105. In use, the apparatus 200 is attached to the injection device 100 such that the fill level sensor 204 is adjacent the window 107 of the cartridge holder 104.

In some examples, the apparatus 200 comprises a memory 207. The memory 207 may store instructions to be carried out by the control unit 201 and/or may store measurements made by the sensor arrangement 204. Control unit 201 may execute program code (e.g. software or firmware) stored in a program memory (not shown) of the memory 207, and use a main memory (not shown) of the memory 207, for instance to store intermediate results. The main memory may also be used to store a logbook of performed ejections/injections and information required to determine a proposal for a next ejection/injection. The program memory may for instance be a Read-Only Memory (ROM), and the main memory may for instance be a Random Access Memory (RAM).

The apparatus 200 may optionally further comprise a display 208. The display 208 may be an LED display, an LCD display or another type of display known in the art, and may be controlled by the control unit 201 to output information to the user, for example a visual indication of the fill level measured by the fill level sensor 204. Display 208 may also be embodied as a touch-screen display, for instance to receive user input.

The apparatus 200 may further comprise a communication module 209 configured to transmit and/or receive information to/from another device, which could be an external device such as a smartphone. The communication module 209 is preferably a wireless communication module 209 configured to transmit and/or receive information to/from another device in a wireless fashion. Such transmission may for instance be based on radio transmission or optical transmission. The wireless communication module 209 may use any known wireless protocol to send and/or receive data, for example Bluetooth. However, in some examples, the communication module 209 may be a wired communication module 209. That is, the wired communication module may be configured to send and/or receive data over a wired connection with an external device.

Figure 3A:
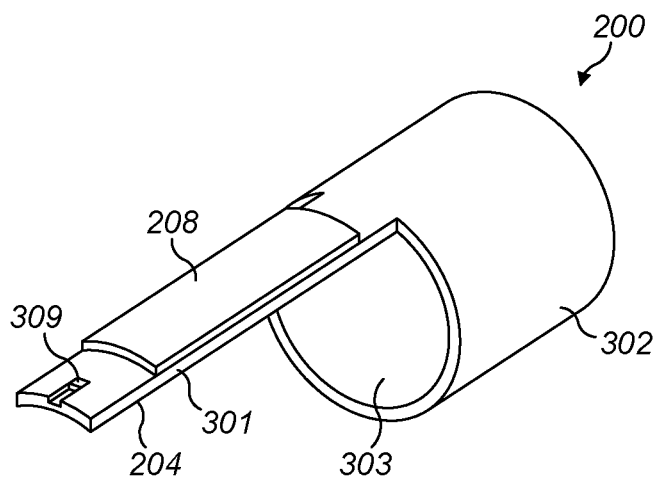
FIG. 3A is an illustration of an apparatus in accordance with an embodiment of the invention.
Figure 3B:
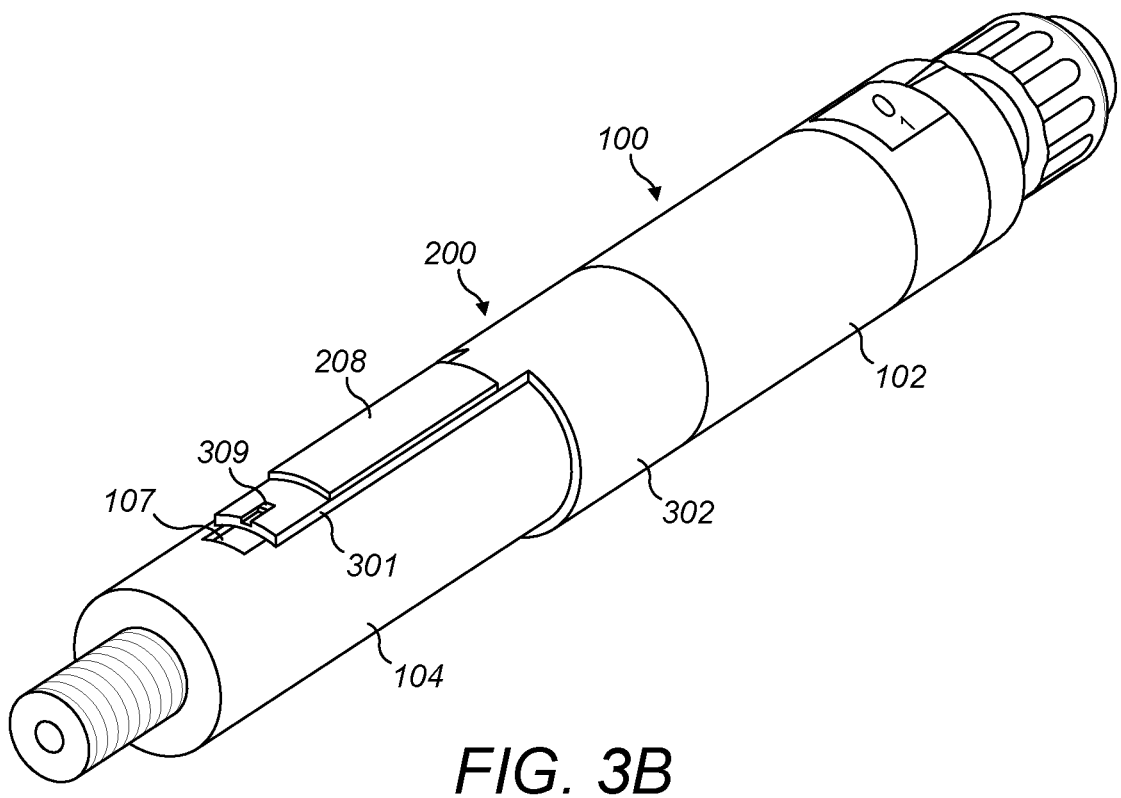
FIG. 3B is an illustration of the apparatus of FIG. 3A mounted on the injection device of FIG. 1.

FIG. 3A shows an embodiment of the apparatus 200 of the present invention. The apparatus 200 is configured to be slidably received over the cartridge holder 104 of the injection device 100, as shown in FIG. 3B.

The apparatus 200 comprises a body 301 and an attachment means for attaching the apparatus 200 to the injection device 100. In the example shown in FIG. 3A, the attachment means comprises a collar 302 extending from the body 301, the collar 302 having an aperture 303. The collar 302 is configured to receive the drug delivery device 100, in particular the cartridge holder 104 of the drug delivery device 100, through the aperture 302. As such, the apparatus 200 is slideable over the cartridge holder 104 along a longitudinal axis of the drug delivery device 100 from the distal end towards the proximal end of the drug delivery device 100, once the cap 112 has been removed from the drug delivery device 100. FIG. 3A shows the collar 302 as a continuous loop of material, however in some cases the collar 302 may not form an entire loop and may instead only partially encircle the injection device 100.

The aperture 303 of the collar 302 is dimensioned to have a diameter greater than the diameter of the cartridge holder 104 but less than the housing 102 of the injection 100 device. As such, the collar 302 of the apparatus 200 can be slid along the longitudinal axis of the cartridge holder 104 until the apparatus 200 abuts the housing 102, but no further.

The attachment means of the apparatus 200 may comprise a fastener 309 configured to engage with a corresponding fastener (not shown) on the drug delivery device 100, in order to secure the apparatus 200 to the drug delivery device 100 in a fixed position. For example, the fastener 309 may comprise one or more of a ridge, groove, bump, lock and/or pip configured to engage with a corresponding ridge, groove, bump, lock and/or pip on the housing 102 or the cartridge holder 104 of the drug delivery device 100. The fastener 309 may be formed on body 301 of the apparatus 200 as shown in FIG. 3A, but additionally or alternatively may be formed on another part of the apparatus 200 such as the collar 302.

The fastener 309 may be configured to engage with the cap retaining feature 111 on the cartridge holder 104 of the drug delivery device 100 to hold the apparatus 200 in position relative to the drug delivery device 100. Additionally or alternatively, the fastener 309 may be arranged on the apparatus 200 so as to engage with a feature of the window 107 of the drug delivery device 100 to hold the apparatus 200 in position relative to the drug delivery device 100. The fastener 309 may fix the apparatus 200 in a fixed rotational and/or translational position with respect to the injection device 100.

This allows the sensor arrangement 204 to be aligned with the window 107 of the cartridge holder 104.

The body 301 of the apparatus 200 comprises the sensor arrangement 204 for measuring the fill level of medicament within a container 105 when a container 105 is held in the cartridge holder 104 of the drug delivery device 100. In the example shown in FIG. 3A, the body 301 and the sensor arrangement 204 extend from the collar 302 in a direction substantially perpendicular to the diameter of the aperture 303. Therefore when the apparatus 200 is attached to the drug delivery device 100, the sensor arrangement 204 extends substantially along the longitudinal axis of the drug delivery device 100.

When the apparatus 200 is attached to the drug delivery device 100, the sensor arrangement 204 extends along the outer surface of the cartridge holder 104, adjacent the window 107 of the cartridge holder 104 such that the sensor arrangement 204 is able to detect the fill level of medicament within a medicament container 105 when a container 105 is held in the cartridge holder 104.

FIG. 3B shows the apparatus 200 of FIG. 3A attached to the injection device 100. The apparatus 200 is positioned so that the sensor arrangement 204 is covering substantially the entire length of the window 107 and so is able to measure the fill level of a medicament container 105.

FIG. 3A and FIG. 3B show the presence of a display 208 on an upper surface of the body 301 of the apparatus 200. The display 200 is located on the body 301 so that it is visible to a user during operation of the apparatus 200. The display 208 may be used to visually communicate information to a user such as a value related to the volume of medicament in the medicament container 105, or an indication that an injection has been completed. However, the display 208 is an optional feature.

Figure 4A:
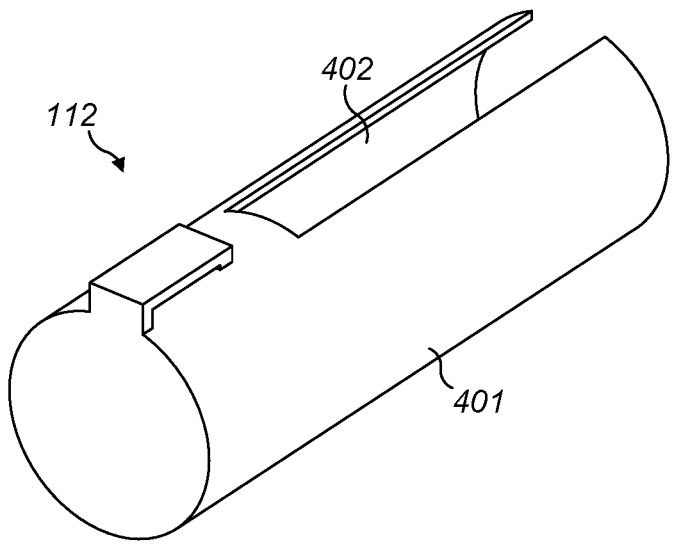
FIG. 4A is an illustration of a cap suitable for use with the apparatus and injection device of FIG. 3B.

FIG. 4A shows an example of a modified cap 112 suitable for use with the apparatus 200 such as the apparatus 200 shown in FIG. 3A. Here the cap 112 comprises a tubular body 401 configured to receive the injection device 100, in particular the cartridge holder 104 of the injection device 100. The tubular body 401 has a cutaway portion 402 to receive at least part of the apparatus 200, such as the body 301, when the cap 112 is attached to the drug delivery device 100.

Figure 4B:
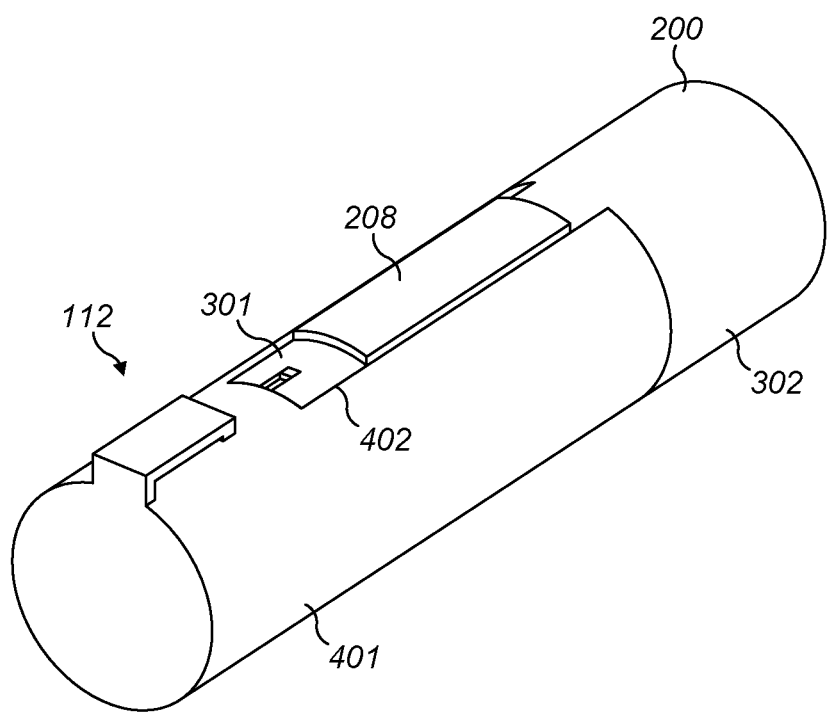
FIG. 4B is an illustration of the cap of FIG. 4A coupled with the apparatus of FIG. 3A.

FIG. 4B shows the modified cap 112 engaged with the apparatus 200 shown in FIG. 3A. However, other suitable cap configurations can be used, for example as disclosed later. In order to attach the cap 112 to the drug delivery device 100, the cap 112 is placed over the cartridge holder 104, sliding from the distal end towards the proximal end of the drug delivery device 100. The cap 112 is removed from the drug delivery device 100 by sliding the cap 112 in a direction from the proximal end towards the distal end of the drug delivery device 100.

Figure 5A:
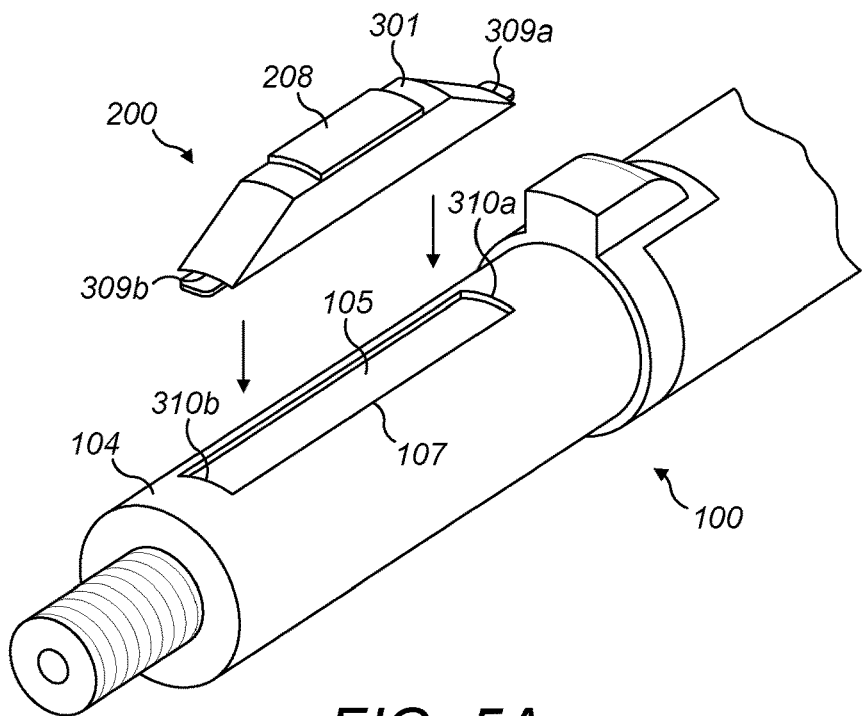
FIG. 5A is an illustration of an apparatus in accordance with a further embodiment of the invention and the injection device of FIG. 1.

FIG. 5A shows an alternative embodiment of the apparatus 200 in which the apparatus 200 is configured to be attached directly to the cartridge holder 104 of an injection device 100, and in particular to the window 107 of the cartridge holder 104.

As for the embodiment described for FIG. 3A, the apparatus 200 shown in FIG. 5A comprises a body 301 and attachment means for attaching the apparatus 200 to the injection device 100.

FIG. 5A also shows the apparatus 200 having the optional display 208, as described previously with reference to FIG. 3A and FIG. 3B.

The apparatus 200 is configured to be attached to the cartridge holder 104 of the injection device 100, within the window 107 of the cartridge holder 104, by the attachment means of the apparatus 200. The attachment means comprise one or more fasteners 309a, 309b on a periphery of the body 301, the one or more fasteners 309a, 309b being arranged to engage with one or more corresponding fasteners 310a, 310b arranged on the cartridge holder 104, around the window 107 of the cartridge holder 104.

The apparatus 200 can be dimensioned to correspond to the shape of the window 107 in order to fit within the window 107. FIG. 5A shows the body 301 of the apparatus 200 having an elongated shape which corresponds to the elongated shape of the window 107.

The apparatus 200 shown in FIG. 5A has a first fastener 309a located at a proximal end of the body 301 and a second faster 309b located at a distal end of the body 301. The first fastener 309a of the apparatus 200 is arranged to engage with a corresponding first fastener 310a located on the cartridge holder 104, adjacent a proximal end of the window 107 of the cartridge holder 104. The second fastener 309b of the apparatus 200 is arranged to engage with a corresponding second fastener 310b located on the cartridge holder 104, adjacent a distal end of the window 107 of the cartridge holder 104.

One or more of the fasteners 309a, 309b of the apparatus 200 may comprise a snap feature such as a ridge, bump, pip or other such protrusion while one or more of the corresponding fasteners 310a, 310b of the cartridge holder 104 may comprise a corresponding groove, wherein the snap feature is arranged to engage with the groove to hold and/or align the apparatus 200 to the injection device 100. In other examples, the one or more of the fasteners 309a, 309b of the apparatus 200 may comprise a groove while one or more of the corresponding fasteners 310a, 310b of the cartridge holder 104 may comprise a snap feature.

The body 301 may additionally have one or more ridges along its longitudinal periphery arranged to engage with a corresponding wall of the window 107 to assist with alignment of the apparatus 200 with respect to the window 107.

The apparatus 200 may be configured to attach to the window 107 of the cartridge holder 104 by pushing the apparatus 200 towards and against the window 107 of the cartridge holder 104 until it clicks into an attached state, as shown by the arrows in FIG. 5A.

Figure 5B:
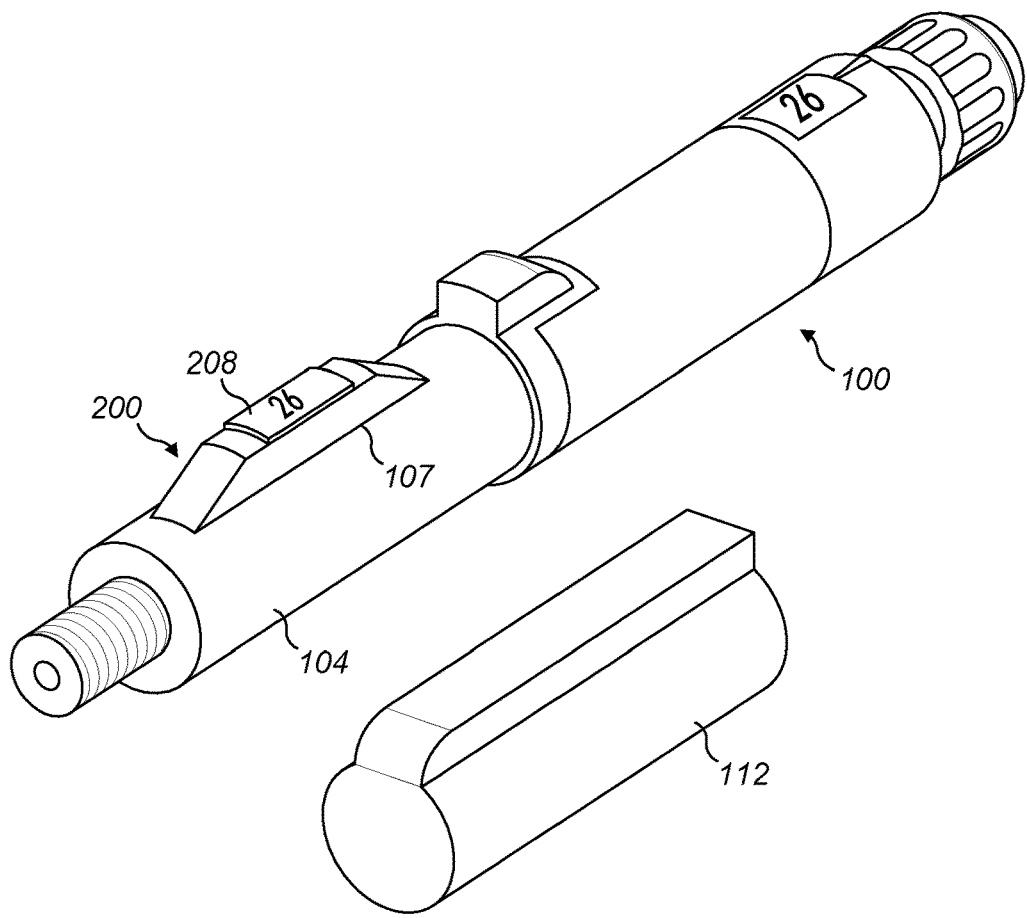
FIG. 5B is an illustration of the apparatus and injection device of FIG. 5A, wherein the apparatus is mounted to the injection device, and of a cap suitable for use with the apparatus and injection device.

FIG. 5B shows the apparatus of FIG. 5A attached to the cartridge holder 104 of the drug delivery device 100, ready for measuring the fill level.

FIG. 5B also shows a modified cap 112 suitable for use with the apparatus 200 of FIG. 5A, or other embodiments of the apparatus 200. Here the cap 112 comprises a tubular body 401 configured to receive the injection device 100, in particular the cartridge holder 104 of the injection device 100. The tubular body 401 has protruding enclosure 403 extending along the length of the cap 112 and configured to pass over the apparatus 200 as the cap 112 is slid onto the drug delivery device 100. However, other suitable cap 112 configurations may be used, such as the cap 112 comprising a cutaway portion 402 as described with reference to FIGS. 4A and 4B.

Figure 6:
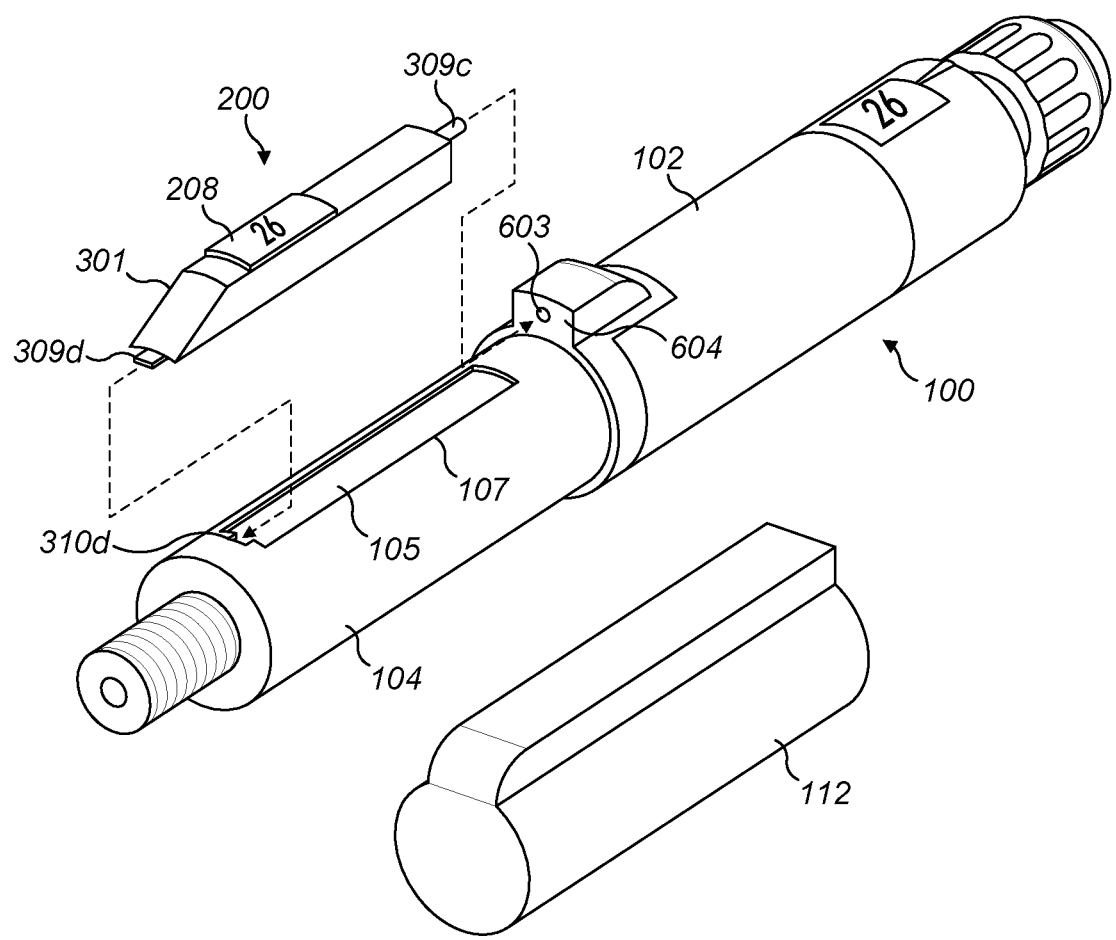
FIG. 6 is an illustration of an apparatus in accordance with a further embodiment of the invention and the injection device of FIG. 1, and of a cap suitable for use with the apparatus and injection device.

FIG. 6 shows a further alternative embodiment of the apparatus 200. In this example, the attachment means of the apparatus 200 comprises a protrusion 309c such as a pin located at a proximal end of the body 301 of the apparatus 200 and a fastener 309d at a distal end of the body 301 of the apparatus 200. The protrusion 301 is configured to be received in an aperture 603 located on the drug delivery device 100. FIG. 6 shows that the aperture 603 is located in a face 604 of the housing 102, at a distal end of the housing 102 adjacent the cartridge holder 104. The protrusion 309c holds the apparatus 200 in a fixed radial position with respect to the longitudinal axis of the injection device 100 when received in the aperture 603.

When attaching the apparatus 200 to the drug delivery device 100, the protrusion 309c is inserted into the aperture 603 of the drug delivery device 100, as indicated by the dotted arrows in FIG. 6. The distal end of the apparatus 200 is then pivoted towards the cartridge holder 104 until the fastener 309d becomes engaged with the cartridge holder 104 to secure the apparatus 200 to the drug delivery device 100. In particular, the fastener 309d engages with a corresponding fastener 310d on the cartridge holder 104 in order to secure the apparatus 200. For example, the corresponding fastener 310d may be located a wall of the window 107 of the cartridge holder 104, as shown in FIG. 6. In some examples, the fastener 310d may be located along an outer surface of the cartridge holder 104 of the apparatus 200, in addition to or alternative to a fastener 602 located on the distal end of the apparatus 200.

FIGS. 7A-D show various exemplary embodiments of the cap sensor 203 in accordance with the present invention, however other suitable types of cap sensor may be used.

Figure 7A:
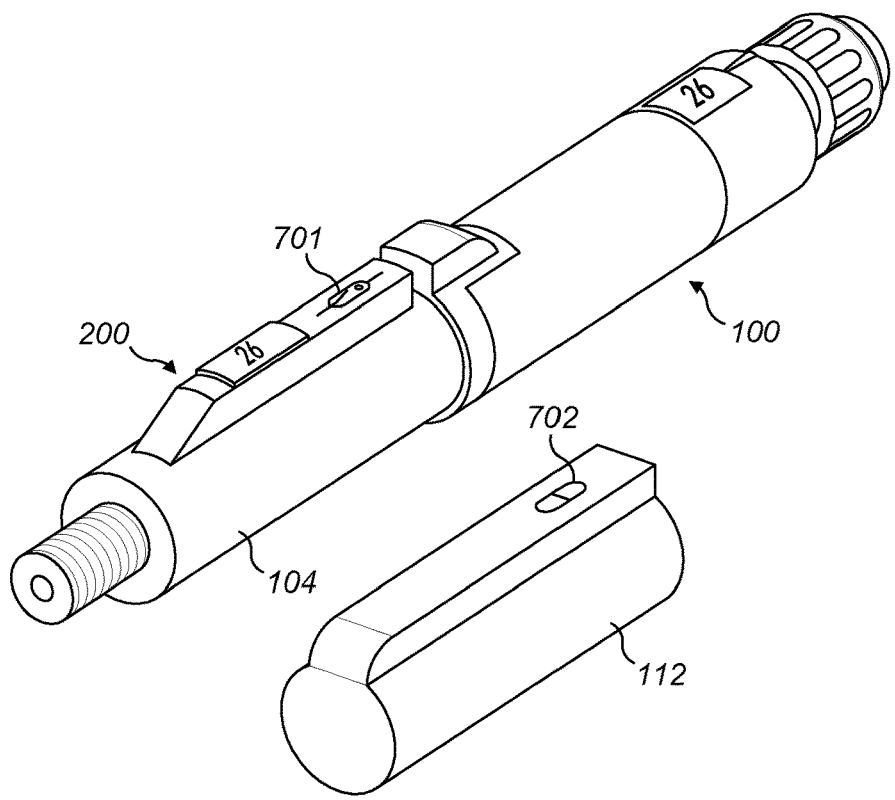
FIG. 7A is a schematic illustration of the apparatus, injection device and cap of FIG. 6 wherein the cap sensor of the apparatus comprises a reed switch.

FIG. 7A shows the cap sensor 203 comprising a reed switch 701. In such an embodiment, the cap 112 comprises a magnet 702. The reed switch 704 is located in the apparatus 200 and the magnet 702 is located in the cap 112 such that when the cap 112 is attached to the drug delivery device 100, the magnet 702 interacts with the reed switch 701. When the cap 112 is at least partially removed from the drug delivery device 100, the magnet 702 is brought out of proximity to the reed switch 701 and this is detected by the reed switch 701, with a corresponding signal sent to the control unit 201. As such, when the cap 112 is at least partially removed from the drug delivery device 100, this is detected by the cap sensor 701 and the control unit 201 is awoken from a dormant state in response. Similarly, attachment/reattachment of the cap 112 is also detected by the reed switch 701.

Figure 7B:
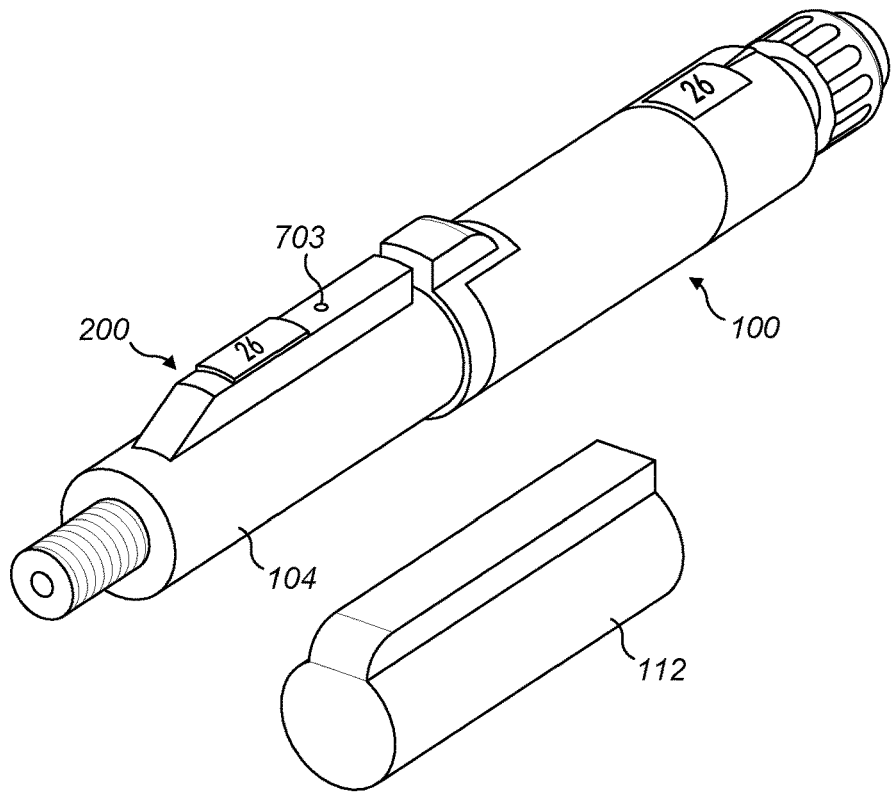
FIG. 7B is a schematic illustration of the apparatus, injection device and cap of FIG. 6 wherein the cap sensor of the apparatus comprises a photosensor.

FIG. 7B shows the cap sensor 703 comprising a photosensor 703 such as a photodiode. The photosensor 703 is arranged to detect a change in ambient light when the cap 112 is removed from the injection device 100. The photosensor 703 is located on the body 301 of the apparatus 200 so that it receives ambient light when the cap 112 is removed from the drug delivery device 100, but less ambient light (or no ambient light) when the cap 112 is attached to the drug delivery device 100. When the cap 112 is at least partially removed from the drug delivery device 100, this is detected by the photosensor 703 as an increase in the amount of ambient light detected by the photosensor 703. In response, the control unit 201 is awoken from a dormant state. Similarly, attachment/reattachment of the cap 112 is also detected by the photosensor 703.

Figure 7C:
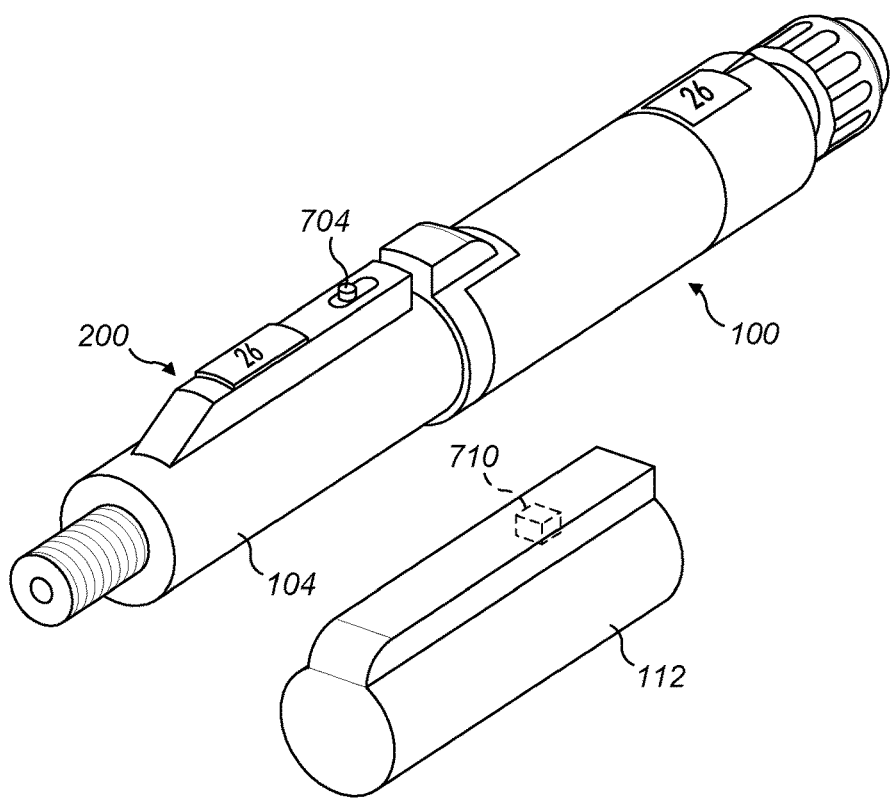
FIG. 7C is a schematic illustration of the apparatus, injection device and cap of FIG. 6 wherein the cap sensor of the apparatus comprises a mechanical switch according to a first example.
Figure 7D:
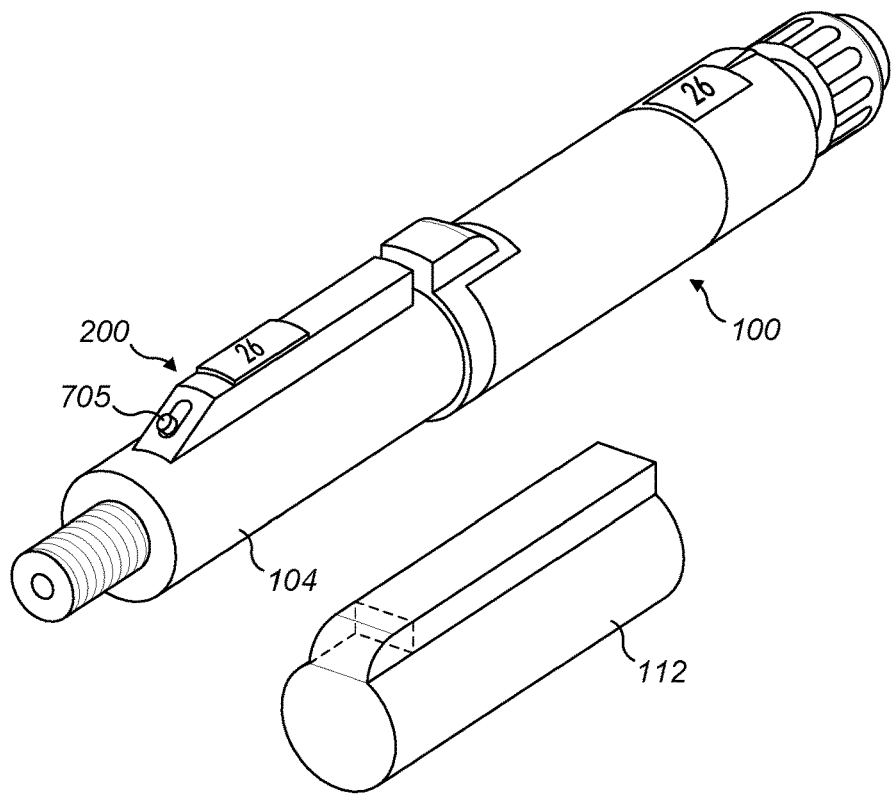
FIG. 7D is a schematic illustration of the apparatus, injection device and cap of FIG. 6 wherein the cap sensor of the apparatus comprises a mechanical switch according to a second example.

FIGS. 7C and 7D show embodiments wherein the cap sensor comprises a mechanical switch 704, 705.

In FIG. 7C the mechanical switch comprises a sliding switch 704 located on a surface of the apparatus 200. The sliding switch 704 is movable between a first longitudinal position and a second longitudinal position relative to the longitudinal axis of the injection device 100. The cap 112 comprises an engaging feature 710, such as a protrusion on an inner surface of the cap 112. The engaging feature 710 is configured to engage with the sliding switch 704 such that, when the cap 112 is attached to the drug delivery device 100, the sliding switch 704 is in the first longitudinal position, while when the cap 112 is at least partially removed from the drug delivery device 100, the engaging feature 710 moves the sliding switch 704 to the second longitudinal position. This change from the first longitudinal position to the second longitudinal position is used to determine the at least partial removal of the cap 112 and in response wake the control unit 201 from the dormant state. Similarly, attachment/reattachment of the cap 112 is also detected by the sliding switch 704.

In FIG. 7D the mechanical switch comprises a button 705 which is in a first (pressed) state when the cap 112 is attached to the drug delivery device 100 and is in a second (released) state when the cap 112 is at least partially removed from the drug delivery device 100. The button is pushed into the first state by an inner surface of the cap 112.

The button 705 may be biased in the second state, for example by a resilient member such as a spring. The change from the first state to the second state results in the making (or in some cases breaking) of an electrical circuit within the mechanical switch, which is used to determine at least partial removal of the cap 112. In response, the control unit 201 is awoken from a dormant state. Similarly, attachment/reattachment of the cap 112 is also detected by the button 705.

FIG. 7E is a schematic top view of the embodiment of the cap 112 and sliding switch 704 shown in FIG. 7C, illustrating how the cap 112 can interact with the sliding switch 704. FIG. 7E shows an initial position of the cap 112 relative to the apparatus 200 wherein the cap 112 is at least partially detached from the apparatus 200. The apparatus 200 and injection device 100 have not been shown in their entirety, for the sake of clarity. The cap 112 is shown in cross-section while the apparatus 200 is shown from a top-view. The cap 112 has an engaging feature 710 arranged on an inner surface of the cap 112. The engaging feature 710 is configured to engage with the sliding switch 704, to move the sliding switch 704 between an open position and closed position as the cap 112 is attached/detached from the apparatus 200.

In the example shown in FIG. 7E, the engaging feature 710 comprises a first resilient protrusion 712 and a second resilient protrusion 714. The first resilient protrusion 712 and second resilient protrusion 714 may be flexible arms. The first resilient protrusion 712 and the second resilient protrusion 714 are biased towards each other. In order to attach or reattach the cap 112 to the apparatus 200, the user places the cap 112 over the end of the apparatus 200 and pushes the cap 112 in the direction indicated by the arrow in FIG. 7E.

FIG. 7F shows the cap 112 and apparatus 200 of FIG. 7E after the cap 112 has moved a certain distance towards the apparatus 200. As the cap 112 is urged by the user towards the apparatus 200, the first resilient protrusion 712 and the second resilient protrusion 714 are urged apart by the sliding switch 704. The sliding switch 704 preferably comprises a circular or rounded projection in order to facilitate the urging apart of the first resilient protrusion 712 and the second resilient protrusion 714. After the first resilient protrusion 712 and the second resilient protrusion 714 have been urged apart, the engaging element 710 engages with the sliding switch 704 such that the sliding switch 704 (or a projection thereof) is held between the first resilient protrusion 712 and the second resilient protrusion 714, as shown in FIG. 7F.

FIG. 7G shows the cap 112 and apparatus 200 of FIG. 7F after the cap 112 has been moved further towards the apparatus 200 such that the cap 112 is now fully attached to the apparatus 200. Movement of the cap 112 towards the apparatus 200 has caused the engaging element 710 to move the sliding switch 704 from a first position to a second position. If the control unit 201 detects that the sliding switch 704 is in the first position then it has been determined that the cap 112 is at least partially detached from the apparatus 200. If the control unit 201 detects that the sliding switch 704 is in the second position then it has been determined that the cap 112 is attached to the apparatus 200.

The stages shown in FIGS. 7E to 7G are reversed when the cap 112 is removed from the apparatus 200. That is, the sliding switch 704 is initially in the second position and held between the first resilient protrusion 712 and the second resilient protrusion 714.

As the cap 112 is removed from the apparatus 200, the engaging element 710 moves the sliding switch 704 back from the second position to the first position. This is due to the resilience of the first resilient protrusion 712 and the second resilient protrusion 714 causing the sliding switch 704 to remain held between the first resilient protrusion 712 and the second resilient protrusion 714 as the cap 112 is removed. Finally, once the cap 112 is further removed from the apparatus 200, and the sliding switch 704 cannot move any further, the engaging element 710 releases the sliding switch 704, as shown in FIG. 7E.

Figure 8:
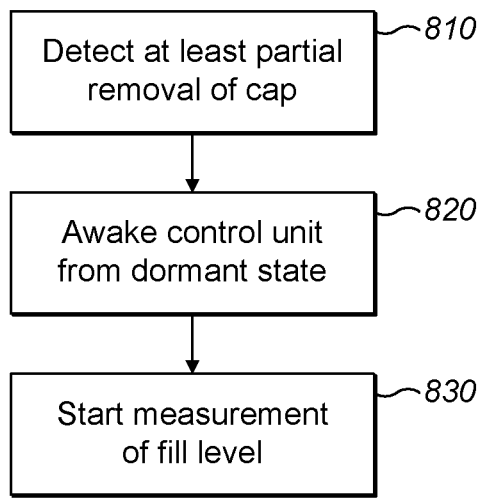
FIG. 8 is a flowchart of an embodiment of a method according to the present invention.

FIG. 8 is a flowchart illustrating a method according to an aspect of the present invention.

A user removes the cap 112 from the drug delivery device 100 prior to performing an injection. In step 810, the at least partial removal of the cap 112 from the drug delivery device 100 is detected by the cap sensor 203. Apparatus 200 wake-up is initiated by detecting cap 112 removal.

In step 820, and in response to detection of the at least partial removal of the cap 112 from the drug delivery device 100, the control unit 201 is awoken from a dormant state to an awoken state. The control unit 201 may not be able to initiate measurement of the fill level using the sensor arrangement 204 when in the dormant state, but can initiate measurement of the fill level when in the awoken state.

In step 830, and subsequent to the control unit 201 being awoken from the dormant state, measurement of the fill level of a medicament within a container 105 of a drug delivery device 100 is initiated. The control unit 201 may cause the sensor arrangement 204 to start measuring the fill level of medicament contained within the container 105 of the drug delivery device 100. The measurement of the fill level may be automatically initiated in response to the control unit 201 being awoken from the dormant state, for example immediately after being awoken or after a predetermined period of time after being awoken. In other examples, measurement of the fill level by the sensor arrangement 204 may be started in response to a signal being received by the wireless communication module 209 from an external device such as a smartphone, wherein the signal is received subsequent to the control unit 201 being awoken.

The sensor arrangement 204 may make a single measurement of fill level or may make a continuous measurement of fill level. In other examples, the sensor arrangement 204 may make a plurality of discrete measurements separated by time intervals, for example a measurement every second. Making a discrete series of measurements can improve the energy efficiency of the apparatus 200 compared to making a continuous measurement. The time intervals between each measurement may vary. For example, the length of each time interval in a sequence of time intervals may increase over time such that the measurement begins with a short time interval, e.g. parts of seconds (1/10, 1/4, . . . ) or seconds (1, 2, 4, . . . ) and ends with an interval of many seconds or minutes, thereby energy consumption can be reduced. The measurement can be ended upon determining that two (or three or more) consecutive measurements provide the same value, or in some examples the same value within a confidence level, such as 5%. The control unit 201 is subsequently placed back into the dormant mode.

The measurement(s) may continue until the cap sensor 203 determines the cap 112 has been reattached to the drug delivery device 100. In some examples, the measurement(s) may continue until the control unit 201 has determined that a predetermined period of time has elapsed, such as a period of time since fill level measurement was initiated or since a signal was received by the wireless communication module 209 from an external device such as a smartphone.

Figure 9:
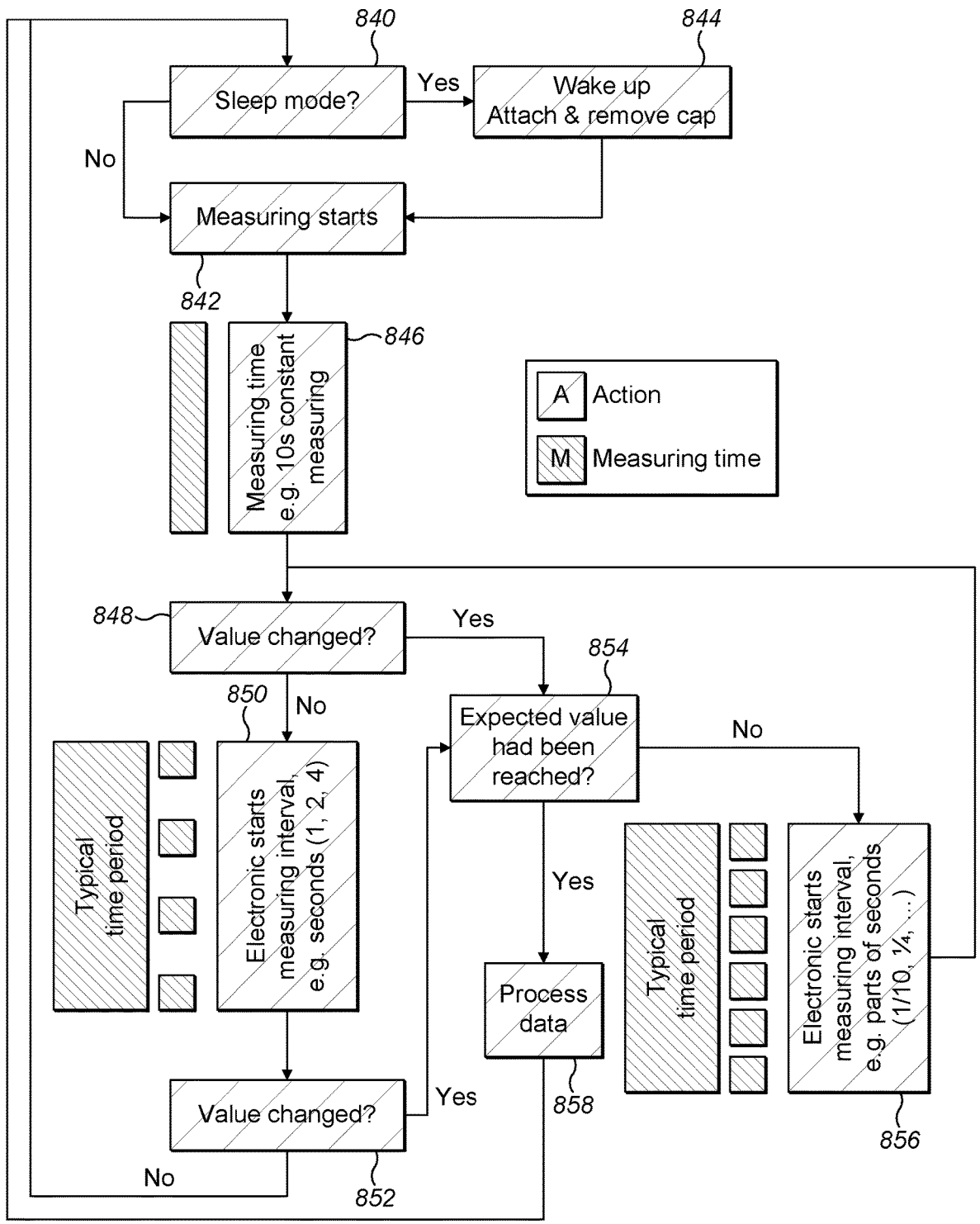
FIG. 9 is a flowchart of an embodiment of a method according to the present invention.

In other examples, such as the example process of FIG. 9, the measurement(s) may continue until determination by the control unit 201 (or an external device such as a smartphone) that a predetermined fill level (value) has been measured by the sensor arrangement 204, and thus that the end of the injection has been reached. In some examples, the measurement(s) may continue until a corresponding signal is received by the wireless communication module 209 from an external device such as a smartphone.

FIG. 9 is an exemplary flowchart of processes carried out by the control unit 201 according to certain embodiments.

In step 840 it is determined whether the apparatus 200 is in the dormant state. If the device is not in the dormant state (i.e. it has been awoken), the apparatus initiates measurement of the fill level (step 842). On the other hand, if it is determined in step 840 that the apparatus 200 is the dormant state, then in step 844 the apparatus 200 is awoken from the dormant state. This step may be performed in response to detection of removal of the cap 112 from the apparatus 200. Once the apparatus 200 has been awoken, the apparatus 200 initiates measurement of the fill level (step 842) using the fill level sensor arrangement 204.

In step 846, the fill level is measured continuously by the sensor arrangement 204 for a period of time, for example 10 seconds. During this time period, or after this time period, it is determined in step 848 whether a measurement of the fill level has changed. If the measurement of the fill level has not changed, or in some examples if the measurement of the fill level has not changed by more than a predefined threshold value, the apparatus 200 stops measuring the fill level continuously and begins measuring the fill level in discrete time intervals (step 850). For example, a measurement may be taken every second. In step 852 it is again determined whether the measurement of the fill level has changed, in some examples by more than a threshold amount. Step 852 may be performed a predetermined time period after step 850 was initiated, or after a predetermined number of discrete measurements have been made during step 850. If it is determined in step 852 that the measurement of the fill level has not changed, or in some examples if the measurement of the fill level has not changed by more than a predefined threshold value, the apparatus 200 can be placed into the dormant state and measurement of the fill level can be stopped. The method of FIG. 9 can then begin again from step 840.

If it is determined at step 848 or step 852 that the measurement of the fill level has changed, or in some examples if the measurement of the fill level has changed by more than a predefined threshold value, the apparatus 200, the method proceeds to step 854 wherein it is determined whether an expected value of fill level has been reached. The expected value of fill level corresponds to a particular measurement of fill level indicative that a desired dose of medicament has been ejected by the injection device 100. If so, the apparatus 200 can process the fill level data in step 858, and in some examples output an audio, visual or haptic alert to the user indicating that the injection is complete. In some examples, processing the data may involve recording one or more fill level measurement values in a memory 207 of the apparatus 200, and/or transmitting one or more measurement values, or an indication that the injection is complete, to a separate external apparatus such as a computer or smartphone, for example using a communication module 209. The apparatus 200 may then be placed in a dormant state and the method returns to step 840.

If at step 854 it has been determined that the expected value of fill measurement has not been reached, the apparatus may begin measuring the fill level in discrete time intervals that are smaller than the discrete time intervals of step 850, for example every 0.1 seconds. The method then returns to step 848.

Figure 10A:
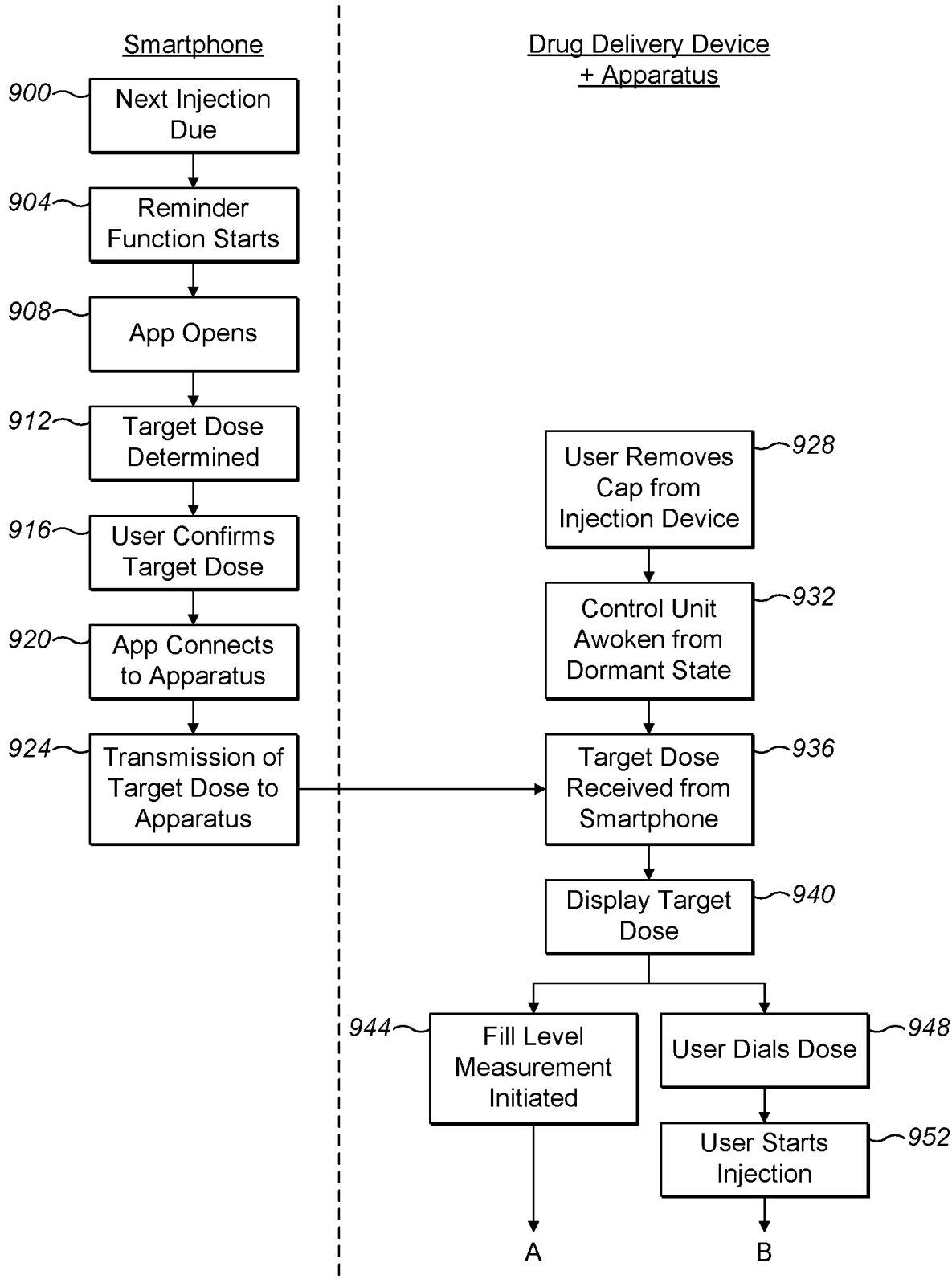
FIG. 10A is a partial flowchart of a further embodiment of a method according to the present invention.
Figure 10B:
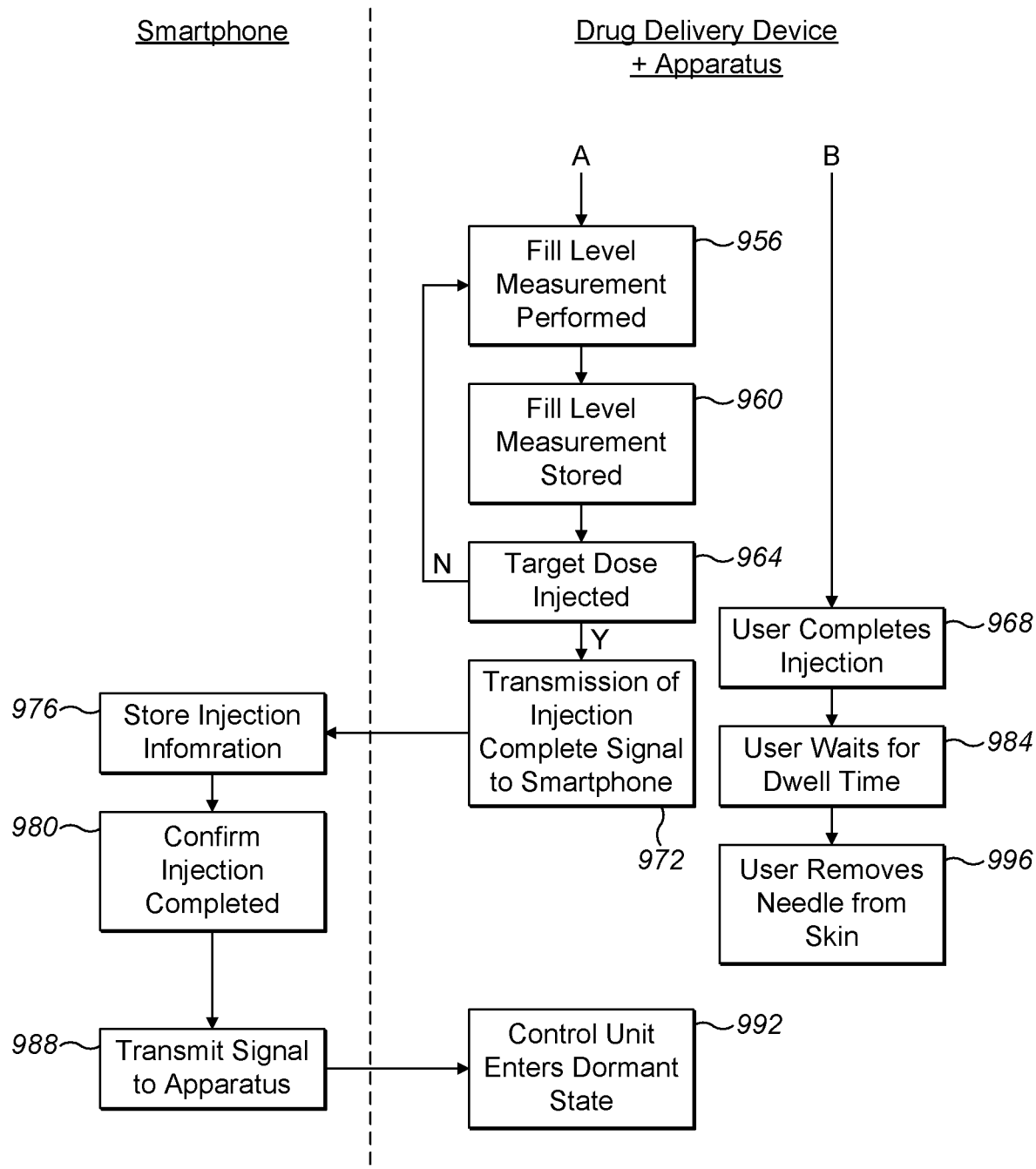
FIG. 10B is a continuation of the flowchart of FIG. 10A.

FIG. 10A and FIG. 10B are flowcharts illustrating a further method of determining a fill level in accordance with exemplary embodiments. FIG. 10B is a continuation of FIG. 10A.

FIGS. 10A and 10B show certain steps of the method being carried out on a smartphone, however another external computing device can be used instead.

At step 900, an injection of medicament is due. At optional step 904, a reminder function starts on the smartphone, indicating that an injection is due. At step 908 an application (app) is opened on the smartphone. The app may open automatically in response to the reminder function starting, or may be opened by a user.

At step 912 a target dose is determined. The target dose represents the volume of medicament that the user should eject from the drug delivery device 100. The user can manually enter the target dose into the smartphone, or the target dose may be calculated by the smartphone based on one or more parameters. The target dose may be calculated based on parameters received by the smartphone from a different external device such as a blood glucose monitor or a server in communication with the smartphone.

At step 916 the user confirms the target dose to be administered. This may be done by the user providing an input to the smartphone, for example selecting a graphical user interface (GUI) icon on a touchscreen of the smartphone, or actuating a button. Other inputs known in the art may be used. In some examples, the target dose may not need to be confirmed.

Once the target dose has been determined and optionally confirmed, the smartphone connects to the apparatus 200

(step 920) if this has not already been done, then wirelessly transmits data indicating the target dose to the apparatus 200 (step 924).

The apparatus receives the data (step 936) via the communication module 209 of the apparatus 200 and can optionally display a visual indication of the target dose on a display 208 of the apparatus 200 so that it is visible to the user (step 940).

At some stage prior to transmission of the target dose from the smartphone to the apparatus, the user removes the cap 112 from the injection device 200 (step 928). In response, the control unit 201 of the apparatus 200 is awoken from a dormant state (step 932) to an awoken state as discussed in relation to FIGS. 8 and 9. The apparatus 200 is therefore now ready to receive the target dose data from the smartphone.

At step 944, measurement of the fill level of medicament within the container 105 of the injection device 100 is initiated. This may be in response to the control unit 201 being awoken in step 932, or in response to receipt of a signal by the communication module 209 from the smartphone, such as the target dose data. Fill level measurement is then performed (step 956) by the control unit 201 and sensing arrangement 204 as previously disclosed.

In step 948, the user dials a dose into the drug delivery device 100 using the dosage knob 114. As the dose is dialled, the user will be able to see an indication of the currently dialled dose on the sleeve of the drug delivery device 100 through the dosage window 116. The user can continue dialling the dose until the dialled dose equals the target dose previously indicated on the smartphone and optionally shown on a display 208 of the apparatus 200.

It is preferable that the display 208 of the apparatus 200 and the dosage window 116 of the drug delivery device 100 are located and oriented with respect to each other such that the user can view both the display 208 and the dosage window 116 simultaneously, or can look between the two with little effort. As such, the user is able to easily determine when the dialled dose equals the target dose indicated on the display 208 of the apparatus 200. Such an appropriate configuration is shown in FIG. 3B, FIG. 5B, FIG. 6 and FIGS. 7A-D.

After the target dose has been dialled, the user starts injection of the medicament from the drug delivery device 100 (step 952) by pushing the injection button 120.

During injection, the sensor arrangement 204 of the apparatus 200 measures the fill level of the medicament (step 956). Data corresponding to each fill level measurement is stored in the memory 207 of the apparatus 200 (step 960).

At step 964 it is determined by the control unit 201 of the apparatus 200 whether the target dose has been injected, thus indicating that the injection is complete. Determination whether or not the target dose has been injected is based on one or more of the fill level measurements. If the target dose has not been injected then the apparatus continues measuring the fill level and storing the measurements (steps 956 and 960) until it is determined that the target dose has been injected.

In order to determine whether the target dose has been injected, the control unit 201 may determine a difference between a first fill level measurement and a subsequent, second fill level measurement. If the difference is greater than or equal to a predetermined value then this can be indicative of the target dose being injected. The predetermined value would have been previously calculated by the smartphone or apparatus 200 based on the target dose.

At step 968 the user completes the injection, and then waits for a dwell time (step 984). Once it has been determined by the apparatus 200 that the target dose has been injected, in step 972 the apparatus 200 transmits a signal to the smartphone indicating that the injection is complete. At this time the control unit 201 may stop further measurement of the fill level.

In response to receiving the signal that the injection is complete, the smartphone may store information relating to the injection in a memory of the smartphone (step 976). For example, the smartphone may store one or more of the target dose, the injected dose, an indication that the injection was completed, a time of the injection starting, and/or a time of the injection being completed. The smartphone may also confirm to the user that the injection is complete (step 980), for example by outputting an audio, visual and/or haptic alert. In step 996, the user removes the needle of the injection device 100 from the skin of the patient. This may be in response to the confirmation output by the smartphone in step 980.

In some examples, the apparatus 200 transmits data representing one or more of the measurements of the fill level to the smartphone. For example, the apparatus 200 may transmit data representing the measured fill level to the smartphone after each measurement of the fill level by the fill level sensor, or after particular time intervals. In this case, the smartphone is continuously updated with the fill level of the medicament. This may be conveyed to the user by a visual indication on a display of the smartphone so that the user may see how the injection is progressing. In such an example, it may be the smartphone that determines when the injection is complete, in addition to or instead of the apparatus making such a determination.

In response to the injection being determined complete, the smartphone may transmit a signal to the apparatus 200 (step 988). In response to receiving this signal, the control unit 201 of the apparatus 200 may enter a dormant state (step 992). In other examples, the apparatus 200 may automatically transition the control unit 201 into a dormant state after determining that the injection is complete, or after a predetermined time period has elapsed.

Figure 11A:
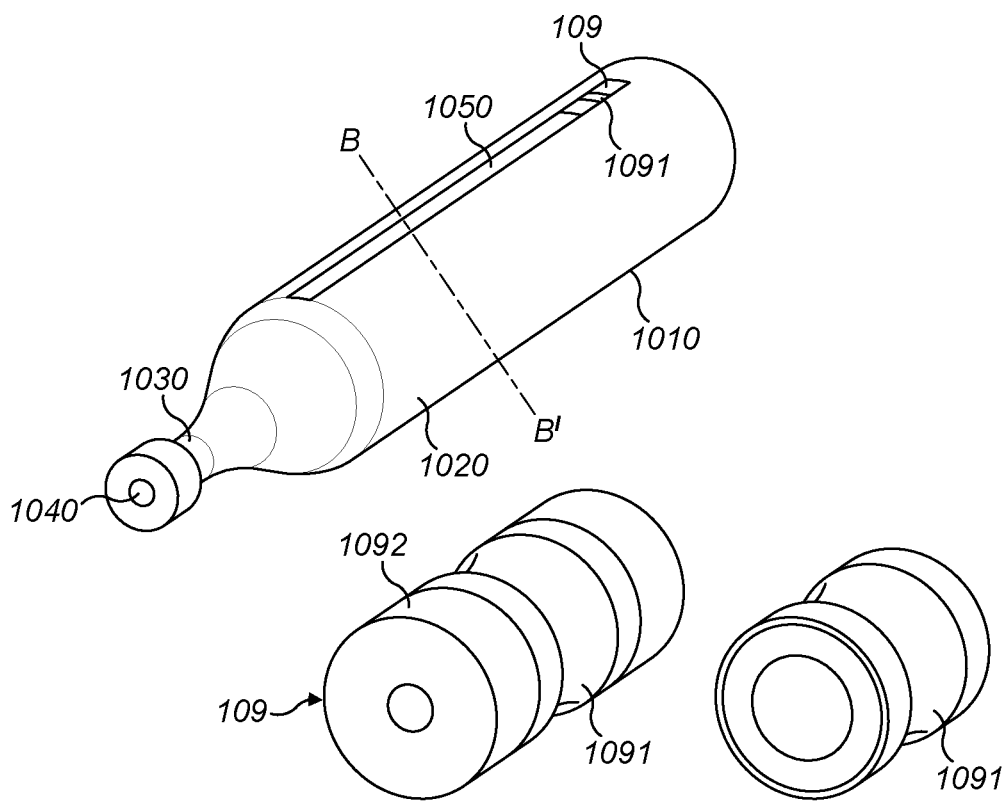
FIG. 11A is an illustration of a medicament container, stopper and reflection ring suitable for use in embodiments of the present invention.

FIG. 11A shows an exemplary medicament container 105, such as a cartridge, according to aspects of the present invention.

The container 105 comprises a substantially cylindrical body 1010 defining a reservoir 1020 for containing medicament, and a stopper 109, also known as a piston, bung or plunger. The stopper 109 is longitudinally moveable within the cylindrical body 1010 from a proximal end to a distal end of the container 105 in order to dispense the medicament from the container 105. The medicament is dispensed through an aperture 1030 of the container 105, which may initially be sealed by a septum 1040. The septum 1040 may be pierced by a needle 109 prior to injection.

The container 105 may be made of a plastic such as cyclic olefin copolymer, or glass. Other suitable materials may be used.

At least part of the container 105 is transparent such that the fill level of the medicament in the container 105 can be viewed from the outside by a user. FIG. 11A shows the container 105 comprising an elongated transparent window 1050 in the cylindrical body 1010, extending from adjacent a proximal end of the container 105 towards a distal end of the container 105. The window 1050 is an optically transparent area of the container 105. In other examples substantially the entire container 105 may be transparent, or more than one window 1050 may be present.

Figure 11B:
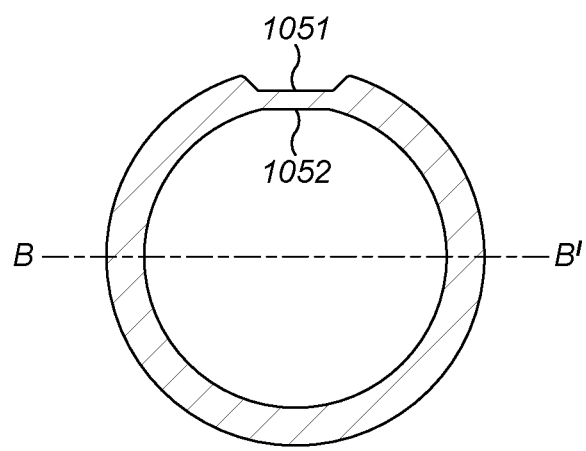
FIG. 11B is a schematic cross-section of the container of FIG. 11A along the line B-B'.

FIG. 11B shows a cross section of the cartridge of FIG. 11A along line B-B'. A portion of the inner surface 1051 and a portion of the outer surface 1052 of the window 1050 are substantially flat and parallel to each other. This can improve the accuracy of fill level determination as described with relation to FIG. 12.

FIG. 11A also shows an exemplary stopper 109 which may normally be located within the container 105. The stopper 109 has a reflective marker such as a reflective ring 1091 around its circumference. When the stopper 109 is located within the container 105, the reflective ring 1091 is visible from outside the container 105, through the elongated transparent window 1050. The position of the reflective ring 1091 with respect to the elongated transparent window 1050 can be used to determine the fill level of the medicament in the container 105. In some examples, the reflective ring 1091 only partly encircles the stopper 109.

Initially when the container 105 is filled with medicament, the reflective ring 1091 will be located near the proximal end of the container 105. As the stopper 108 is moved from the proximal end towards the distal end of the container 105, thus dispensing medicament from the container 105, the reflective ring 1091 is also moved from the proximal end towards the distal end of the container 105. The position of the reflective ring 1091 relative to the container 105 is therefore indicative of the fill level of the medicament in the container 105.

Figure 12:
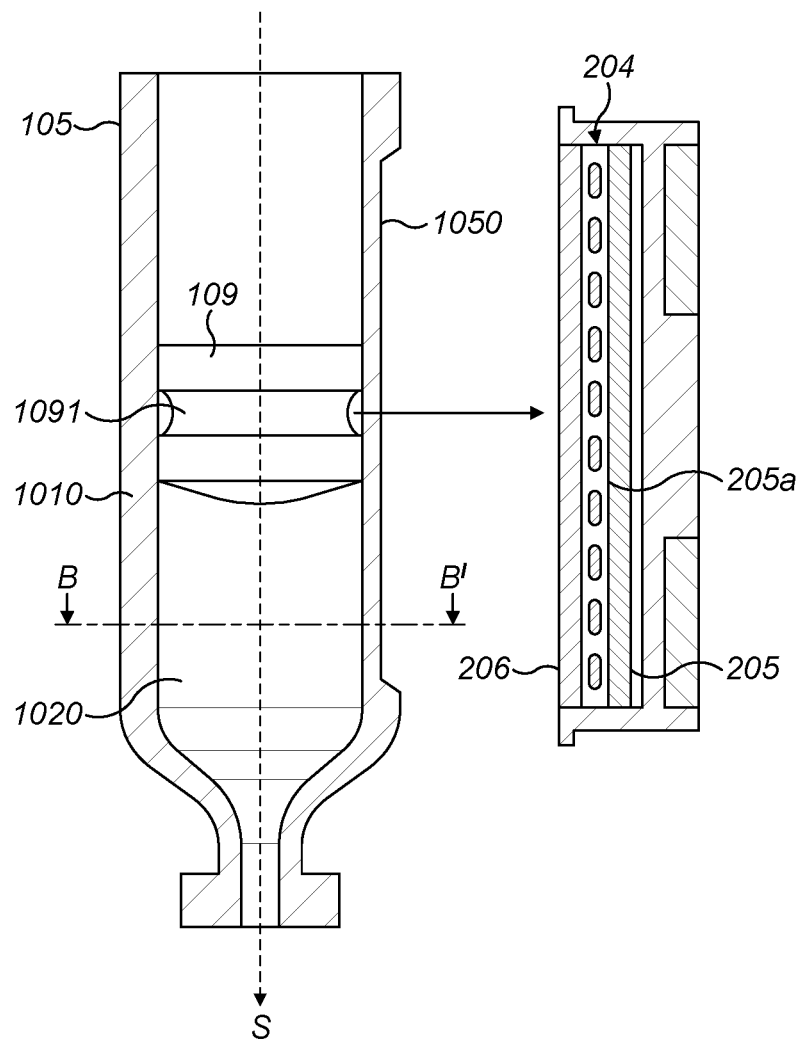
FIG. 12 is a schematic view of the container of FIG. 11A and a fill level sensor arranged to measure the fill level of medicament in the container in accordance with embodiments of the present invention.

FIG. 12 shows an arrangement for measuring a fill level in a container 105 in accordance with aspects of the present invention. In this arrangement, the sensor arrangement 204 of the apparatus 200 comprises a light source 205 and a light sensor 206. The light source 205 comprises a plurality of LEDs 205a arranged linearly along a plane such that they are parallel to the longitudinal axis of the container 105 indicated by the dotted arrow, adjacent the elongated transparent window 1050, when the apparatus 200 is attached to the injection device 100. However, in some examples the light source 205 may be a single LED, or one or more other types of light source. The light sensor 206 of the sensor arrangement 204 comprises a charge-coupled device (CCD) arranged parallel to the longitudinal axis of the container 105, adjacent the elongated transparent window 1050, and in a plane parallel to the plane of the LEDs 205a. However, in some examples, a different form of light sensor 206 can be used. The light source 205 and light sensor 206 are preferably adjacent each other, which allows for a compact apparatus 200 design.

The light sensor 206 is configured to detect light from the light source 205 that has been reflected by the reflection ring 1091. In operation, light emitted from the one or more LEDs 205a of the light source 205 is transmitted through the elongated transparent window 1050 and into the container 105. At least part of the light is reflected by the reflective ring 1091 of the stopper 109 back out through the elongated transparent window 1050. The reflected light is detected by the light sensor 206. In particular, the location of the reflected light relative to the container 105 is detected by the light sensor 205. The location of the reflected light, or rather the location of the peak intensity of the reflected light, relative to the container 105 is indicative of the position X of the stopper 109 in the container 105 and therefore the fill level of the medicament M in the container 105. A measurement of the fill level can be determined by the control unit 201 based on one or more signals output from the sensor arrangement 204.

Figure 13:
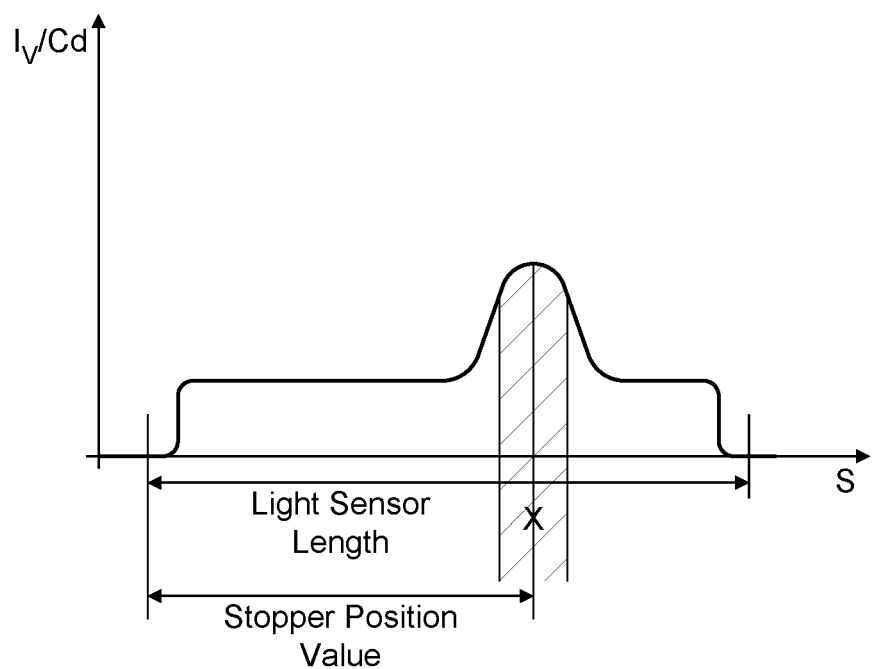
FIG. 13 is a graph illustrating the variation in reflected light intensity with distance along the container of FIG. 12.

FIG. 13 is a graph illustrating the variation in light intensity I determined by the light sensor 206 with position s along the longitudinal axis of the container 105 of FIG. 12 for a stopper 109 positioned at location X along the longitudinal axis of said container 105. The reflective nature of the reflection ring 1091 means that a peak in light intensity corresponds to the position of the stopper 109 relative to the container 105. The position of the stopper 109 can be used to infer the fill level of medicament in the container 105, for example using a known volume of the container 105.

Figure 14:
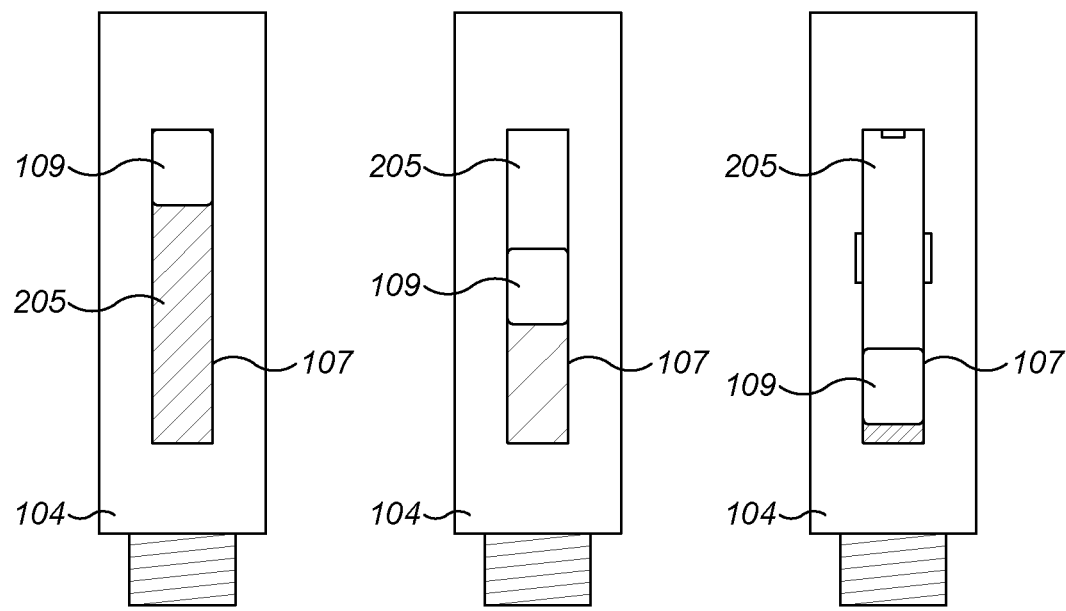
FIG. 14 is a schematic view of the fill level sensor of FIG. 12 being used to provide visual feedback to a user in accordance with aspects of the present invention.

FIG. 14 shows how the sensor arrangement 204 can be used to provide feedback to the user regarding the fill level of medicament in the container 105. The light emitted by the light source 205 such as the LEDs 205a is visible to a user outside the device 100. In such a scenario, at least a portion of the medicament container 105 is transparent, and at least a portion of the cartridge holder 104 opposite the window 107 over which the apparatus 200 is attached is transparent. Light from the one or more LEDs 205a therefore passes to the outside of the device 100, via the cartridge 105.

In some examples, one or more of the LEDs 205a may illuminate a first colour, such as green, when the container 105 when it is determined by the control unit 201 and sensor arrangement 204 that the medicament container 105 is full or substantially full of medicament. One or more of the LEDs 205a may then illuminate a second colour, such as yellow or orange, when it is determined by the control unit 201 and sensor arrangement 204 that the medicament container 105 is partially full of medicament. One or more of the LEDs 205a may then illuminate a third colour, such as red, when it is determined by the control unit 201 and sensor arrangement 204 that the medicament container 105 is empty or substantially empty of medicament.

In some examples, the number of LEDs 205a currently illuminated may correspond to the fill level. For example, a plurality of LEDs 205a may be illuminated when the container 105 is full or substantially full of medicament; fewer LEDs 205a may be illuminated when the container 105 is partially full of medicament; then even fewer LEDs 205a (or even none of the LEDs 205a) may be illuminated when the container 105 is empty or substantially empty of medicament.

Although claims have been formulated in this application to particular combinations of features, it should be understood that the scope of the disclosure also includes any novel features or any novel combinations of features disclosed herein either explicitly or implicitly or any generalisation thereof, whether or not it relates to the same invention as presently claimed in any claim and whether or not it mitigates any or all of the same technical problems as does the present invention. The applicant hereby gives notice that new claims may be formulated to such features and/or combinations of features during the prosecution of the present application or of any further application derived therefrom.

Although several embodiments have been shown and described, it would be appreciated by those skilled in the art that changes may be made in these embodiments without departing from the principles of the invention, the scope of which is defined in the claims.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N-(N-lithocholyl-gamma-glutamyl)-des(B30) human insulin; B29-N-(w-carboxyheptadecanoyl)-des(B30) human insulin and B29-N-(w-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An example of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen. Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts. Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

The invention claimed is:

1. An apparatus comprising:
   a control unit;
   a sensor arrangement configured to measure a fill level of a medicament within a container of a drug delivery device; and
   a cap sensor configured to detect at least partial removal of a cap from the drug delivery device,
   wherein the control unit is configured to be awoken from a dormant state in response to a detection by the cap sensor that the cap has been at least partially removed from the drug delivery device,
   wherein the sensor arrangement is configured to start measurement of the fill level subsequent to the control unit being awoken from the dormant state, and
   wherein the control unit controls the sensor arrangement to discretely measure the fill level with an increasing or decreasing frequency over time based on a previously measured fill level.

2. The apparatus of claim 1, wherein the measurement of the fill level is started in response to the detection by the cap sensor that the cap has been at least partially removed from the drug delivery device.

3. The apparatus of claim 1, wherein the apparatus comprises a wireless communication module and wherein measurement of the fill level is started in response to receipt of a signal by the wireless communication module.

4. The apparatus of claim 1, wherein the apparatus is a supplemental device attachable to the drug delivery device.

5. The apparatus of claim 4, wherein the apparatus is attachable to a cartridge holder of the drug delivery device, the cartridge holder being configured to contain the container.

6. The apparatus of claim 1, wherein the apparatus comprises a collar, wherein the collar is configured to receive a cartridge holder of the drug delivery device through an aperture of the collar.

7. The apparatus of claim 1, wherein the sensor arrangement is configured to measure the fill level through a window in a cartridge holder of the drug delivery device.

8. The apparatus of claim 1, wherein the apparatus comprises a wireless communication module and is configured to transmit a signal from the wireless communication module to an external device, the signal comprising data representing one or more fill level measurements made by the sensor arrangement.

9. The apparatus of claim 8, wherein measurement of the fill level is stopped in response to the wireless communication module of the apparatus receiving a signal from the external device.

10. The apparatus of claim 1, wherein measurement of the fill level is stopped in response to detection by the cap sensor of the cap being reattached to the drug delivery device.

11. The apparatus of claim 1, wherein the apparatus is configured to stop measurement of the fill level in response to determining that the fill level has not changed for a predetermined period of time or for a predetermined number of measurements.

12. A system comprising a drug delivery device and an apparatus attached to the drug delivery device, wherein the apparatus comprises:
 a control unit;
 a sensor arrangement configured to measure a fill level of a medicament within a container of the drug delivery device; and
 a cap sensor configured to detect at least partial removal of a cap from the drug delivery device,
 wherein the control unit is configured to be awoken from a dormant state in response to a detection by the cap sensor that the cap has been at least partially removed from the drug delivery device,
 wherein the sensor arrangement is configured to start measurement of the fill level subsequent to the control unit being awoken from the dormant state, and
 wherein the control unit controls the sensor arrangement to discretely measure the fill level with an increasing or decreasing frequency over time based on a previously measured fill level.

13. The system of claim 12, wherein the drug delivery device comprises a container containing a medicament, the container comprising a stopper having a reflective ring around a circumference of the stopper, wherein the sensor arrangement is configured to measure a fill level of the medicament by determining a position of the stopper in relation to a longitudinal axis of the container, wherein determining a position of the stopper comprises emitting light towards the container and detecting light reflected back from the container by the reflective ring.

14. A method comprising:
 detecting, by a cap sensor of an apparatus, at least partial removal of a cap from a drug delivery device;
 in response to the detecting of the at least partial removal of the cap from the drug delivery device, awaking a control unit of the apparatus from a dormant state; and
 starting measurement, by a sensor arrangement of the apparatus, of a fill level of a medicament within a container of the drug delivery device subsequent to the control unit being awoken from the dormant state, wherein the control unit controls the sensor arrangement to discretely measure the fill level with an increasing or decreasing frequency over time based on a previously measured fill level.

15. The method of claim 14, wherein the apparatus comprises a wireless communication module, and wherein the method further comprises: transmitting a signal from a wireless communication module to an external device, the signal comprising data representing one or more fill level measurements made by the sensor arrangement.

16. The method of claim 15, further comprising: stopping the measurement of the fill level in response to the wireless communication module receiving a signal from the external device.

17. The method of claim 14, further comprising: stopping the measurement of the fill level in response to a detection by the cap sensor of the cap being reattached to the drug delivery device.

18. The method of claim 14, further comprising stopping the measurement of the fill level in response to determining that the fill level has not changed for a predetermined period of time or for a predetermined number of measurements.

* * * * *